(12) United States Patent
Yasuda et al.

(10) Patent No.: US 9,397,886 B2
(45) Date of Patent: Jul. 19, 2016

(54) MULTI-TENANCY INFORMATION PROCESSING SYSTEM, MANAGEMENT SERVER, AND CONFIGURATION MANAGEMENT METHOD

(75) Inventors: Yoshiko Yasuda, Tokorozawa (JP); Toshiomi Moriki, Kokubunji (JP); Susumu Takase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 13/809,368

(22) PCT Filed: Jul. 12, 2011

(86) PCT No.: PCT/JP2011/065843
§ 371 (c)(1),
(2), (4) Date: May 14, 2013

(87) PCT Pub. No.: WO2012/035861
PCT Pub. Date: Mar. 22, 2012

(65) Prior Publication Data
US 2013/0227097 A1    Aug. 29, 2013

(30) Foreign Application Priority Data
Sep. 14, 2010  (JP) ................................ 2010-205559

(51) Int. Cl.
*G06F 15/177* (2006.01)
*H04L 12/24* (2006.01)
*H04L 29/08* (2006.01)

(52) U.S. Cl.
CPC ........ *H04L 41/0806* (2013.01); *H04L 41/0813* (2013.01); *H04L 67/1097* (2013.01)

(58) Field of Classification Search
CPC ............ H04L 41/0806; H04L 41/0893; H04L 41/0813; G06F 9/4856; G06F 9/5077; G06F 2009/4557; G06F 2009/45595
See application file for complete search history.

(56) References Cited

U.S. PATENT DOCUMENTS

| 2009/0180489 | A1* | 7/2009 | Fujita et al. ................. 370/409 |
| 2009/0187970 | A1* | 7/2009 | Mower et al. ................ 709/226 |
| 2009/0288084 | A1* | 11/2009 | Astete et al. ................. 709/226 |
| 2010/0017517 | A1 | 1/2010 | Arai et al. |
| 2010/0115342 | A1* | 5/2010 | Shigeta et al. ................ 714/37 |

FOREIGN PATENT DOCUMENTS

JP         2010-026699 A         2/2010

OTHER PUBLICATIONS

U.S. Appl. No. 13/568,659, filed Aug. 7, 2010, Ozawa.
(Continued)

*Primary Examiner* — Liangche A Wang
*Assistant Examiner* — Ayele Woldemariam
(74) *Attorney, Agent, or Firm* — Foley & Lardner LLP

(57) ABSTRACT

In a multi-tenancy information processing system, a necessary setting change item and a target NW device are specified at the time of changing a configuration of a virtual machine of a tenant. A management server 116 includes a device management table 352 for each tenant and each segment, in which an NW setting item set for a network (NW) device is stored for each of the NW devices corresponding to the segment of the tenant, in advance. The management server 116 receives a configuration change request including type information on a request representing addition, deletion, or movement of the virtual machine, an identifier of a target tenant, and an identifier of a target segment.

15 Claims, 17 Drawing Sheets

(56) References Cited

OTHER PUBLICATIONS

U.S. Appl. No. 13/421,308, filed Mar. 15, 2012, Yasuda et al.
VMware vSphere—Vmware Vnetwork Distributed Switch; [online] Retrieved on Jul. 7, 2010 from the Internet: <URL: http://www.vmware.com/jp/products/vnetwork-distributed-switch/features.htm>l; pp. 1-4.
Yoshizawa, Masahiro, et al.; Implementation and Evaluation of Network Management System to Reduce Management Cost Caused by Server Virtualization; IEICE Technical Report vol. 109, No. 273; Nov. 5, 2009; pp. 71-76.
PCT International Search Report on application PCT/JP2011/065843 mailed Sep. 20, 2011; 2 pages.

* cited by examiner

| SEGMENT IDENTIFIER | USE CASE OF VIRTUAL MACHINE | THE NUMBER OF VIRTUAL MACHINE | DEVICE MANAGEMENT TABLE IDENTIFIER |
|---|---|---|---|
| SEGMENT A | OUTSIDE(DMZ) | 1 | POINTER TO DEVICE MANAGEMENT TABLE 352a OF SEGMENT A |
| SEGMENT B | OUTSIDE(DMZ) | 2 | POINTER TO DEVICE MANAGEMENT TABLE 352b OF SEGMENT B |
| SEGMENT C | INSIDE | 2 | POINTER TO DEVICE MANAGEMENT TABLE 352c OF SEGMENT C |
| SEGMENT D | INSIDE | 1 | POINTER TO DEVICE MANAGEMENT TABLE 352d OF SEGMENT D |

501 502 503 504

510 511 512 513

(a) 352a

| TARGET DEVICE | SETTING ITEM | | |
|---|---|---|---|
| | FILTERING | ROUTING | VLAN SETTING |
| FIREWALL141a | O | | |

(b) 352c

| TARGET DEVICE | SETTING ITEM | | |
|---|---|---|---|
| | FILTERING | ROUTING | VLAN SETTING |
| FIREWALL141a | O | | |
| FIREWALL141c | | O | |
| SWITCH161a | | O | |
| SWITCH161b | | | O |
| SWITCH161c | | | O |

FIG.6

| 701 TYPE | 702 TARGET SEGMENT | 703 CLASSIFI-CATION | 704 PRESENCE OR ABSENCE OF VIRTUAL MACHINE IN TARGET SEGMENT AFTER CHANGING CONFIGURATION | 705 CHANGE IN THE NUMBER OF SEGMENTS AFTER CHANGING CONFIGURATION | 706 SETTING ITEM | 707 SETTING TYPE |
|---|---|---|---|---|---|---|
| ADD | EXISTING | ADDITION TARGET | IGNORE | NO CHANGE | (i) | GENERATE | 710a
|  | NEW | ADDITION TARGET | IGNORE | INCREASE | (i)(ii)(iii) | GENERATE | 710b
| DELETE | EXISTING | DELETION TARGET | ABSENT | DECREASE | (i)(ii)(iii) | DELETE | 710c
|  |  |  | PRESENT | NO CHANGE | (i) | GENERATE | 710d
| MOVE | EXISTING EXISTING | SOURCE TARGET | PRESENT PRESENT | NO CHANGE NO CHANGE | (i) (i) | DELETE GENERATE | 710e
|  | EXISTING EXISTING | SOURCE TARGET | ABSENT PRESENT | DECREASE NO CHANGE | (i)(ii)(iii) (i) | DELETE GENERATE | 710f
|  | EXISTING NEW | SOURCE TARGET | PRESENT PRESENT | NO CHANGE INCREASE | (i) (i)(ii)(iii) | DELETE GENERATE | 710g
|  | EXISTING NEW | SOURCE TARGET | ABSENT PRESENT | DECREASE INCREASE | (i)(ii)(iii) (i)(ii)(iii) | DELETE GENERATE | 710h (i) FILTERING
(ii) ROUTING
(iii) VLANS SETTING

| VLAN IDENTIFIER 1501 | TENANT IDENTIFIER | SEGMENT IDENTIFIER 1502 |
|---|---|---|
| VLAN 1 | TENANT1 | SEGMENT A |
| VLAN 2 | TENANT1 | SEGMENT B |
| VLAN 3 | TENANT2 | SEGMENT F |

354

1510, 1511, 1512

| | | GATEWAY | |
|---|---|---|---|
| SOURCE | TARGET ADDRESS/NET MASK | GATEWAY ADDRESS1 | GATEWAY ADDRESS2 |
| SEGMENT A | SEGMENT B | | |
| SEGMENT B | SEGMENT C | | |

MULTI-TENANCY INFORMATION PROCESSING SYSTEM, MANAGEMENT SERVER, AND CONFIGURATION MANAGEMENT METHOD

TECHNICAL FIELD

The present invention relates to a multi-tenancy information processing system, a management server, and a configuration management method, and more particularly to a multi-tenancy information processing system, a management server, and a configuration management method, which promptly and property specify a setting change item and a target NW device on the basis of a tenant identifier, a use case of a virtual machine, and a segment condition, when changing the configuration of the virtual machine of a tenant in a multi-tenancy information processing system having a flexible network configuration.

BACKGROUND

In recent years, the application of cloud computing (cloud) to a data center (DC) has been advanced. In a general cloud, a DC provider virtualizes and constructs a plurality of corporate IT systems or a plurality of business systems within a corporate enterprise on an information processing system having servers, storages, and networks. Because the cloud is based on a virtualization technology, the cloud is excellent in scalability as compared with a physical system. On the other hand, because the plurality of corporate IT systems are integrated into single information processing system, the plurality of IT systems are mixed together and complicated. For example, the virtualized IT system for each client, or the virtualized business system, which are integrated into the cloud is called "tenant".

For the purpose of avoiding the complicated configuration, in an example of the cloud currently provided, server resources and storage resources can be customized in the IT system configuration to be provided to the clients, but the coupling configuration of the network is fixed. For that reason, the application of the corporate IT systems to the cloud is limited.

CITATION LIST

Patent Literature

Patent Literature 1: JP-A-2010-26699

Non Patent Literature

Non Patent Literature 1: VMware operating manual, [online], VMware Inc., [search on July 2010], internet <http://www.vmware.com/jp/products/vnetwork-distributed-switch/features.html>
[Non Patent Literature 2] "Implementation and Evaluation of Network Management System to Reduce Management Cost Caused by Server Virtualization", Technical Report of IEICE, NS, Network System 109 (273), p. 71-76, November 2009

SUMMARY OF INVENTION

Problems to be Solved by the Invention

On the other hand, with flexible network configuring the cloud, it is easy to apply the corporate IT system to the cloud. However, when the IT system of each client is cloud computed as it is, the design and construction of the network is complicated. This is because the network configuration is different depending on the client IT system. For example, a plurality of switches, security devices, firewall devices, and load balancer devices are selectively used according to requirements from each client, and plural types of network devices (hereinafter, NW devices) arranged in the physical system are differently used for each client. For that reason, the configuration of a network segment and a routing point are varied according to each client (routing and filtering are complicated).

In the multi-tenancy information processing system having the flexible network configuration as described above, when the number of virtual machines is increased or decreased in a certain tenant, it is difficult to rapidly specify which of the servers and the NW devices configuring the client IT system on the information processing system must be changed in setting, and change the setting. This is, for example, because the types of the severs and the NW devices which are constituent elements of the system, the network segment configuration, routing, and filtering such as policy are varied according to the tenant.

Thus, in the multi-tenancy information processing system, because a plurality of network segments are present in each tenant, there is a need to set not only a single VLAN as in the related art, but also routing to another VLAN, and filtering between the virtual machines. In this case, there arise issues that how the setting needs to be changed at the time of changing the virtual machine configuration of a target tenant, and in which NW device the setting change should be set in are briefly and promptly specified.

The following techniques are disclosed for automatically changing the setting of the servers and the NW devices with a configuration change of the virtual machines.

Non Patent Literature 1 discloses, for example, a technique in which, in the installation of the additional VM (virtual machine), when a VLAN is set for the VM, the VM automatically takes over filtering information associated with the VLAN (related art 1). Also, when the VM travels, the VM takes over the VLAN setting within a virtual switch, to thereby make the setting change on the virtual switch side unnecessary.

Non Patent Literature 2 discloses, for example, a technique in which physical and logical coupling configurations of the servers and the NW devices are managed to facilitate the setting work of the VLAN associated with the installation of the additional virtual machine (related art 2). When a VLAN identifier for coupling of the virtual machine is input when installing the additional virtual machine, a coupling configuration of a plurality of switches associated with the VLAN identifier is searched, and an associated switch group is specified to automatically conduct the VLAN setting for the plurality of switches.

Patent Literature 1 discloses, for example, that the setting of the routers and the switches is changed at the same time when the virtual machine exceeds the network segment, and travels between the physical servers (related art 3).

The above-mentioned related arts 1 to 3 pertain to the setting of the NW devices according to the configuration change of the virtual machine. However, the issues intended by the present invention cannot be solved by the related arts from the following viewpoints.

In the related art 1, only the virtual switch coupled directly to the VM is target, and a plurality of NW devices cannot be set. Also, when the VM travels, only the VM belonging to the same segment takes over the VLAN setting in the switch, and when the VM belongs to another network segment after traveling, a manager needs to design a setting change item, specify a device to be subjected to the setting change, and execute the setting change. Further, in the case where a client system is configured by using a plurality of VLANs, when the configuration of the VM is changed, it cannot be specified what setting change item is required for any device (for example, whether the VLAN setting is necessary, whether the routing is necessary, whether the filtering is necessary).

In the related art 2, there is no means for grasping a correspondence relationship between the VLAN coupling the VM and the other VLANs at the time of changing the configuration of the VM. As a result, it is difficult to specify whether the routing or the filtering is necessary between the VLAN to which the added VM belongs and the other VLANs. Also, it is difficult to specify which device the setting is reflected on.

In the related art 3, the VLAN setting of the router and the switch can be automatically changed when the virtual machine travels. However, because all of the switches and the routers are to be set, when the configuration elements of the network are different for each of the tenants, it cannot be specified what NW device is associated therewith. For that reason, there is a need to search the setting of all the NW devices. Also, as in the related art 2, there is no means for grasping a correspondence relationship between the VLAN coupling the VM and the other VLANs at the time of changing the configuration of the VM. As a result, it is impossible to specify whether the routing or the filtering is necessary between the VLAN to which the added VM belongs and the other VLANs. Also, it is difficult to specify which device the setting is conducted on.

The present invention has been made in view of the above circumstances, and therefore an object of the present invention is to rapidly specify a necessary setting change item and the target NW device when changing the configuration of the virtual device of the tenant in a multi-tenancy information processing system having a flexible network configuration.

Solving Means to Problems (1) In the multi-tenancy information processing system having the flexible network configuration, the NW devices configuring the system are shared by a plurality of tenants, and the type and number of the NW devices to be used, and the network segment configuration are changed according to the tenants.

(2) In the status of the above item (1), when the additional virtual machine is installed, the setting change item and the NW device to be subjected to the setting change associated with the installation of the additional virtual machine are changed according to each of the tenants, and the target NW device cannot be fixed. Also, the NW setting item to be changed is changed according to the use case of the additional virtual machine to be installed, and the network segment, and the target NW device on which the setting is reflected is changed.

In the above-mentioned multi-tenancy information processing system, the necessary setting change item and the target NW device are rapidly specified when changing the configuration of the virtual machine of the tenant.

According to the first solving means of this invention, there is provided a management server in a multi-tenancy information processing system having plural types of network devices, a server device, and the management server, configuring a tenant which is a virtual network system including a desired network device of the network devices and a virtual machine configured by the server device for each client, in which the tenant has a plurality of segments, the management server comprising:

a device management table for storing, for each tenant and each segment, network setting items set for a network device in correspondence with an identifier of the network device corresponding to the segment of the tenant in advance; and a tenant configuration changing unit that specifies the network setting items to be set and the network devices being a setting target at the time of changing the configuration of the virtual machine, wherein the tenant configuration changing unit receives, from a management console, a configuration change request including type information on a request representing any one of addition, deletion, and movement of the virtual machine, a tenant identifier of a target tenant, and a segment identifier of a target segment, determines whether or not the virtual machine is present in the target segment of the target tenant after changing the configuration, and/or whether or not the target segment of the target tenant is existing, specifies one or a plurality of the network setting items on the basis of the type information on the request included in the configuration change request, and both or either determination results of whether or not the virtual machine is present in the target segment after changing the configuration, and determination results of whether or not the target segment is existing, and specifies one or plurality of the network devices corresponding to one or the plurality of specified network setting items, with reference to the device management table.

According to the second solving means of this invention, there is provided a multi-tenancy information processing system comprising:

plural types of network devices; a server device; and a management server, the system configuring a tenant which is a virtual network system including a desired network device of the network devices and a virtual machine configured by the server device for each client, in which the tenant has a plurality of segments, wherein the management server comprising:

a device management table for storing, for each tenant and each segment, network setting items set for a network device in correspondence with an identifier of the network device corresponding to the segment of the tenant in advance; and a tenant configuration changing unit that specifies the network setting items to be set and the network devices being a setting target at the time of changing the configuration of the virtual machine, wherein the tenant configuration changing unit receives, from a management console, a configuration change request including type information on a request representing any one of addition, deletion, and movement of the virtual machine, a tenant identifier of a target tenant, and a segment identifier of a target segment, determines whether or not the virtual machine is present in the target segment of the target tenant after changing the configuration, and/or whether or not the target segment of the target tenant is existing, specifies one or a plurality of the network setting items on the basis of the type information on the request included in the configuration change request, and both or either determination results of whether or not the virtual machine is present in the target segment after changing the configuration, and determination results of whether or not the target segment is existing, and specifies one or plurality of the network devices corresponding to one or the plurality of specified network setting items, with reference to the device management table.

According to the third solving means of this invention, there is provided a configuration management method in a multi-tenancy information processing system having plural types of network devices, a server device, and a management server, configuring a tenant which is a virtual network system including a desired network device of the network devices and a virtual machine configured by the server device for each client, in which the tenant has a plurality of segments, for specifying network setting items to be set and network devices being a setting target at the time of changing configuration of a virtual machine, the configuration management method comprising:

receiving by the management server, from a management console, a configuration change request including type information on a request representing any one of addition, deletion, and movement of the virtual machine, a tenant identifier of a target tenant, and a segment identifier of a target segment, determining by the management server, whether or not the virtual machine is present in the target segment of the target tenant after changing the configuration, and/or whether or not the target segment of the target tenant is existing, specifying by the management server, one or a plurality of the network setting items on the basis of the type information on the request included in the configuration change request, and both or either determination results of whether or not the virtual machine is present in the target segment after changing the configuration, and determination results of whether or not the target segment is existing, and specifying by the management server, one or plurality of the network devices corresponding to one or the plurality of specified network setting items, with reference to a device management table for storing, for each tenant and each segment, network setting items set for a network device in correspondence with an identifier of the network device corresponding to the segment of the tenant in advance.

According to the fourth solving means of this invention, there is provided a configuration management program executed by a computer in a multi-tenancy information processing system having plural types of network devices and a server device, configuring a tenant which is a virtual network system including a desired network device of the network devices and a virtual machine configured by the server device for each client, in which the tenant has a plurality of segments, for specifying network setting items to be set and network devices being a setting target at the time of changing configuration of a virtual machine, the configuration management program causes the computer to execute:

a step in which the computer receives, from a management console, a configuration change request including type information on a request representing any one of addition, deletion, and movement of the virtual machine, a tenant identifier of a target tenant, and a segment identifier of a target segment, a step in which the computer determines whether or not the virtual machine is present in the target segment of the target tenant after changing the configuration, and/or whether or not the target segment of the target tenant is existing, a step in which the computer specifies one or a plurality of the network setting items on the basis of the type information on the request included in the configuration change request, and both or either determination results of whether or not the virtual machine is present in the target segment after changing the configuration, and determination results of whether or not the target segment is existing, and a step in which the computer specifies one or plurality of the network devices corresponding to one or the plurality of specified network setting items, with reference to a device management table for storing, for each tenant and each segment, network setting items set for a network device in correspondence with an identifier of the network device corresponding to the segment of the tenant in advance.

Advantageous Effects of Invention

According to the present invention, the setting change item and the target device may be rapidly and easily specified at the time of changing the configuration of the virtual machine of a specified tenant.

Also, as compared with the related art, in the present invention, in the complicated system, the setting item of the NW device and the target device may be rapidly and simply specified by utilizing the use case and segment information at the time of changing the configuration of the virtual machine.

BRIEF DESCRIPTION OF DRAWINGS

FIG. 5 illustrates a configuration example of a tenant segment management table 351.

FIG. 6 illustrates a configuration example of a device management table 352.

FIG. 7 illustrates a configuration example of a setting items specifying table 353.

FIG. 15 illustrates a configuration example of a VLAN management table 354.

FIG. 16 illustrates a configuration example of a route management table 355.

DESCRIPTION OF EMBODIMENTS

Figure 1:
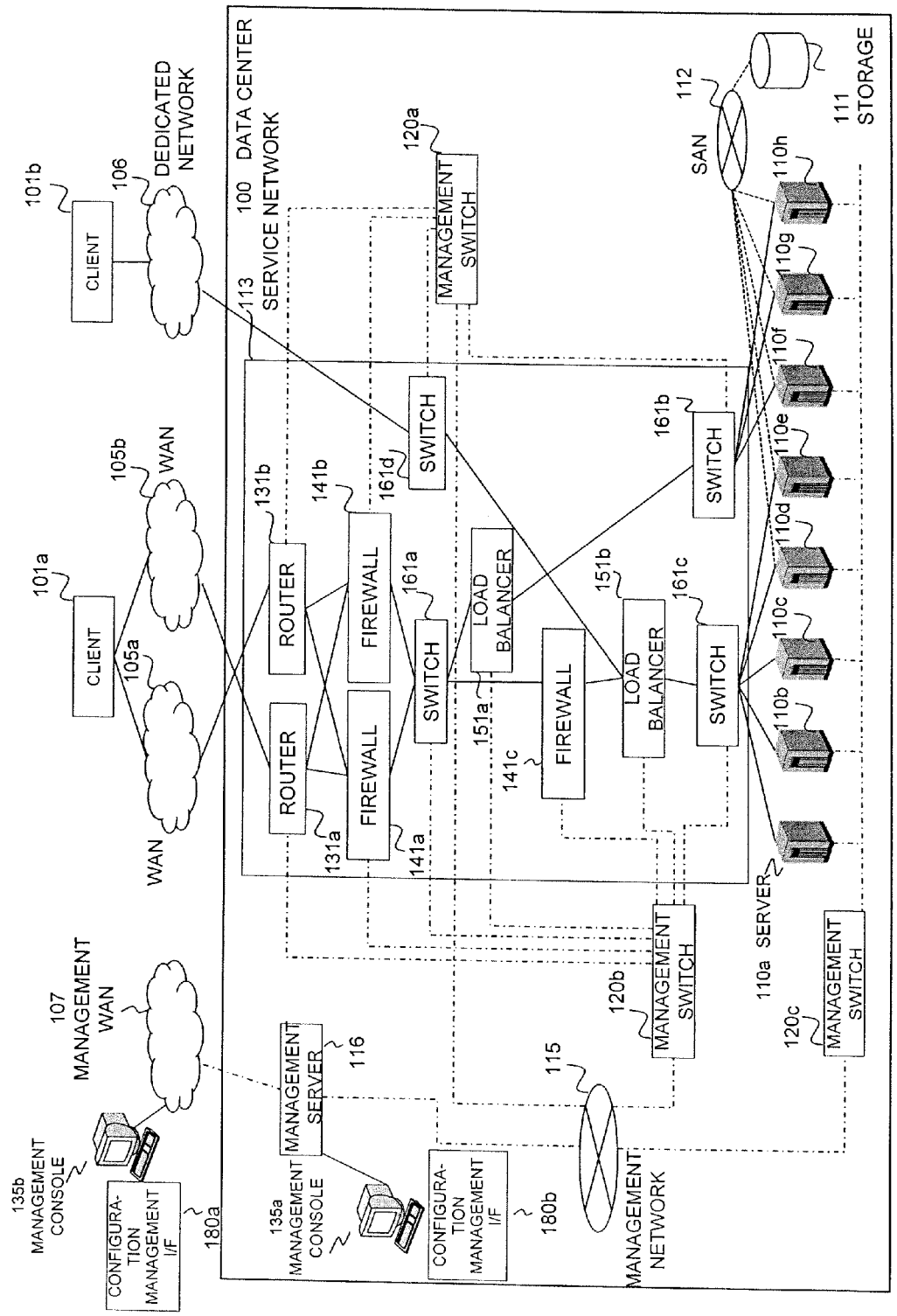
FIG. 1 is a diagram illustrating a system configuration according to an embodiment of the present invention.

FIG. 1 is a diagram illustrating a system configuration according to an embodiment of the present invention.

A data center 100 communicates with, for example, devices of clients 101a and 101b through appropriate networks such as WANs 105a, 105b, and a dedicated network 106. The data center 100 includes a server 110 that provides a service to the clients, a storage 111 that is coupled to the server through a storage area network (SAN), a service network 113, a management switch 120, a management server 116, and a management console 135a having a configuration management I/F 180b. The SAN 112 may have an appropriate coupling form such as a fiber channel protocol. The management switch 120 is coupled to, for example, the respective devices (physical devices) within the data center 100, and coupled to the management server 116 through a management network 115. Also, the management server 116 in the data center 100 communicates with a management console 135b having a configuration management interface (I/F) 180a through a management WAN 107. The numbers of servers 110 and management switches 120 are not limited to one, but may be plural.

The management server 116 receives a tenant identifier, a use case of a virtual machine, and segment information from a management console 135 as inputs, and specifies a setting item and a device with the use of the received information.

The service network 113 includes physical devices such as one or a plurality of routers 131, firewalls 141, load balancers 151, and switches 161. According to a requirement from each of the clients, the devices such as the plurality of routers 131, firewalls 141, load balancers 151, or switches 161 are selectively used to configure a tenant. In the present specification, the tenant represents a system virtually configured for each of the clients.

The routers 131, the firewalls 141, and the load balancers 151 are each provided as one physical device, but may virtually provide functions for providing a plurality of routers, firewalls, and load balancers. In this case, for example, one tenant may use one virtual router function among physical routers as occasion demands. Alternatively, in recent years, an integrated network device may be provided in which the functions of the router, the load balancer, and the firewall are mounted on one physical device. Further, in recent years, there appears a virtual network appliance that realizes the functions of the routers 131, the firewalls 141, and the load balancers 151 by software, and are mounted on the virtual machine. Accordingly, not only the physical devices but also virtual network appliance devices may be provided in the service network 113 to be subjected to configuration management. When the above integrated network device and the respective virtual network appliance devices are provided in the service network, only a physical coupling relationship among the devices inside of the service network 113 is different, and the target items, which are not shown in the present invention, for each device are identical with those in the conventional physical devices. A configuration management method using the physical devices will be described.

Figure 17:
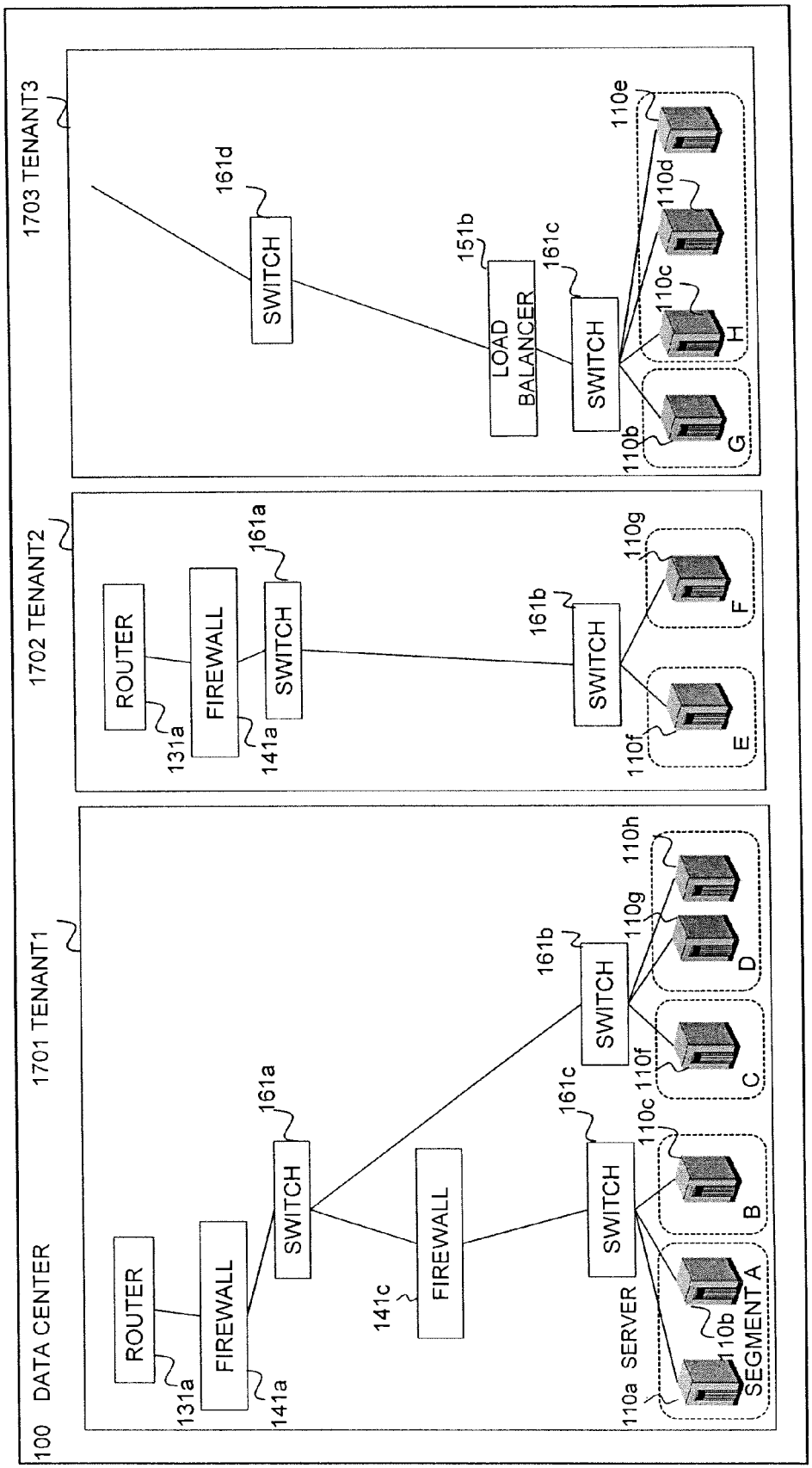
FIG. 17 illustrates a configuration example of a multi-tenant system.

FIG. 17 illustrates a configuration example of a multi-tenant system.

Within the data center 100, a virtual service network for each of the clients is configured with the use of the respective physical devices. The physical devices configuring the virtual service network are changed according to the tenant. The respective physical devices and servers are used in a plurality of the virtual service networks.

For example, a tenant 1 (1701) includes a router 131a, a firewall 141a, a switch 161a, a firewall 141c, and switches 161c, 161d. The servers 110 are arranged in a plurality of segments. The tenant 1 includes, for example, segments A to D. The segments are, for example, segments (for example, the segments C and D in FIG. 17) that section a portion in which a server group (for example, web servers, mail servers) used for communication with an external such as the internet is arranged, and segments (for example, the segments A and B in FIG. 17) in which business servers within a corporate network are arranged through the firewall 141c, which are called, generally, "demilitarized zone (DMZ)".

A tenant 2 (1702) includes, for example, the router 131a, the firewall 141a, the switch 161a, and a switch 161b. Also, the tenant 2 includes segments E and F as the segments in which the servers are arranged.

A tenant 3 (1703) includes, for example, the switch 161d, a load balancer 151b, and the switch 161c. Also, the tenant 3 includes segments G and H as segments in which the servers are arranged. The configuration of the tenant 3 is used in a case in which the client accesses to the tenant through the dedicated network. The configurations of the tenants are not limited to the above configurations, but may be appropriately set.

Figure 2:
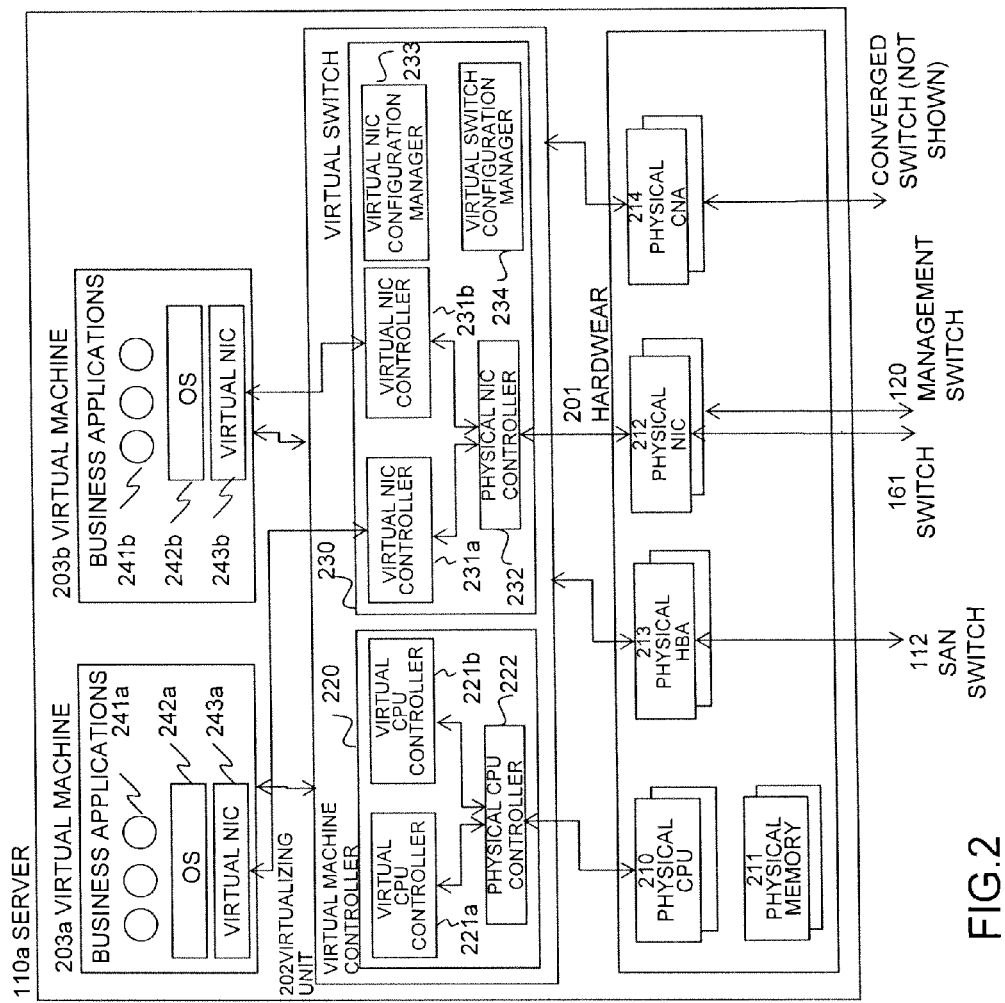
FIG. 2 illustrates a configuration example of a server 110a according to the embodiment of the present invention.

FIG. 2 illustrates a configuration example of a server 110a according to the embodiment of the present invention. Since the same is applied to the configurations of the other servers 110b to 110h, the server 110a will be described, and a description of the other servers will be omitted.

The server 110a has a physical hardware 201. The hardware 201 includes a physical CPU 210, a physical memory 211, a physical network interface card (NIC) 212, and a physical host bus adapter (HBA). The hardware 201 also includes a converged network adapter (CNA) 213 that converges the functions of the physical NIC and the physical HBA. One type of the converged network adapter accepts, for example, InfiniBand and FCoE. In general, the CNA may be used as a conventional fiber channel card as well as a network card. Also, when the CNA is used, as a switch coupled with an end of the CNA, a switch that accepts a converged network protocol is used (not shown).

The server 110a is virtualized, and includes a virtualizing unit 202, and virtual machines 203a, 203b. The virtualizing unit 202 includes a virtual machine controller 220 and a virtual switch 230. The virtual machine controller 220 includes virtual CPU controllers 221a, 221b, and a physical CPU controller 222, and allocates a virtual CPU resource to a virtual machine 203 in cooperation with the physical CPU 210. The virtual switch 230 includes virtual NIC controllers 231a, 231b, a physical NIC controller 232, a virtual NIC configuration manager 233, and a virtual switch configuration manager 234. As with the virtual machine controller 220, the virtual NIC controllers 231a, 231b, and the physical NIC controller 232 allocate a virtual interface resource to the virtual machine 203 in cooperation with the physical NIC 212. The virtual NIC configuration manager 233 sets a capacity and a bandwidth of a virtual NIC. The virtual switch configuration manager 234 manages the switch when communicating between the virtual machines.

The virtual machine 203a includes a business application 241a, an operating system (OS) 242, and a virtual NIC 243. Although not shown, the virtual machine 203a may include a virtual HBA and a virtual CNA. The same is applied to the virtual machine 203b.

The server 110 may use VMware, Hyper-V, and Xen for the virtualizing unit 202.

Figure 3:
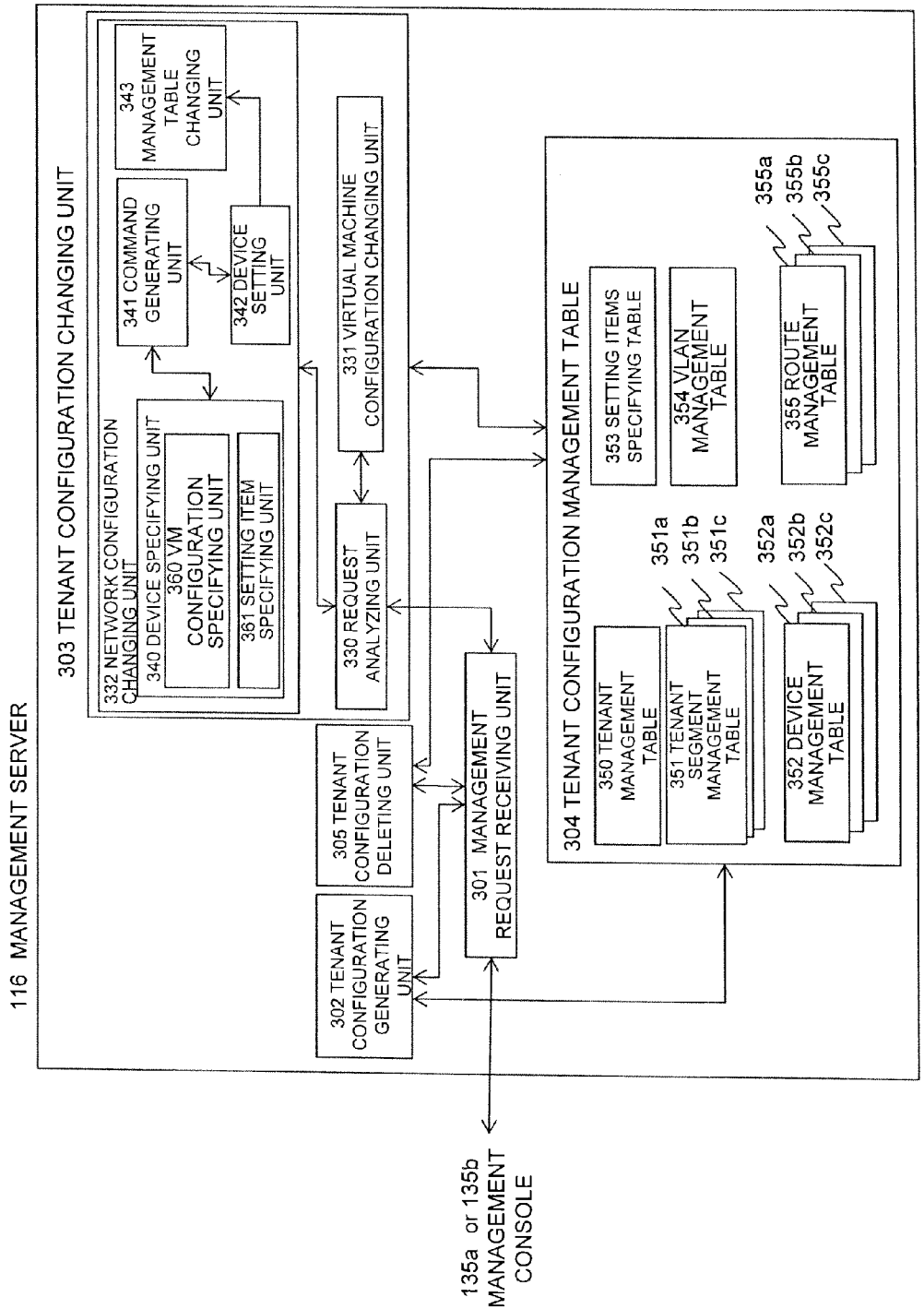
FIG. 3 illustrates a configuration example of a management server 116 according to the embodiment of the present invention.

FIG. 3 illustrates a configuration example of the management server 116 according to the embodiment of the present invention.

The management server 116 includes, for example, a configuration management request receiving unit 301, a tenant configuration generating unit 302, a tenant configuration changing unit 303, a tenant configuration management table 304, and a tenant configuration deleting unit 305.

The configuration management request receiving unit 301 receives a configuration management request from the management consoles 135a and 135b, checks the contents of the configuration management request, and transfers the configuration management request to any one of the tenant configuration generating unit 302 and the tenant configuration changing unit 303.

When first configuring the system of the tenant, the tenant configuration generating unit 302 receives information presenting the configuration of the network, and defaults respective items of the tenant configuration management table 304.

The tenant configuration changing unit 303 includes, for example, a request analyzing unit 330, a virtual machine configuration changing unit 331, and a network configuration changing unit 332. The network configuration changing unit 332 includes a device specifying unit 340, a command generating unit 341, a device setting unit 342, and a management table changing unit 343. Also, the device specifying unit 340 includes a VM configuration specifying unit 360, and a setting item specifying unit 361.

Also, the tenant configuration deleting unit 305 deletes the configuration of the tenant. In addition to processing conducted by the tenant configuration changing unit 303, the tenant configuration deleting unit 305 deletes an appropriate item from a tenant management table 350.

The request analyzing unit 330 analyzes, for example, whether the configuration management request input from the configuration management request receiving unit 301 is an addition request, a deletion request, or a moving request for the virtual machine. The virtual machine configuration changing unit 331 updates the setting in the plurality of servers on the basis of request analysis results. For example, the virtual machine configuration changing unit 331 sets the virtual NIC and the VLAN to be allocated to the NIC. The processing of the virtual machine configuration changing unit 331 may be conducted by using a known technique. The network configuration changing unit 332 changes the setting in the network devices configuring the service network 113.

The device specifying unit 340 specifies a setting target device required to set the setting item on the basis of a request kind analyzed by a request analysis, the tenant identifier belonging to the virtual machine, a segment identifier of the virtual machine, and the use case of the virtual machine. The command generating unit 341 generates one or more commands for each of the devices specified by the device specifying unit 340. The device setting unit 342 sets the command (s) generated by the command generating unit 341 for each of the devices. The management table changing unit 343 reflects setting change contents on the management table 304.

The tenant configuration management table 304 includes a table for managing the network (NW) devices configuring the tenant for each of the tenants, and NW setting of each NW device. For example, the tenant configuration management table 304 includes the tenant management table 350, a plurality of tenant segment management tables 351, a plurality of device management tables 352, a setting items specifying table 353, a VLAN management table 354, and a plurality of route management tables 355 for each tenant. The tenant segment management tables 351 are provided for each of the tenants. Also, the device management tables 352 are provided for each of the tenants and each of the segments.

At the time of changing the virtual machine configuration of the tenant, the management server 116 rapidly specifies necessary NW setting and the NW device group to be subjected to the NW setting by the aid of the use case of the virtual machine and the network segment information in addition to the tenant identifier.

Figure 4:
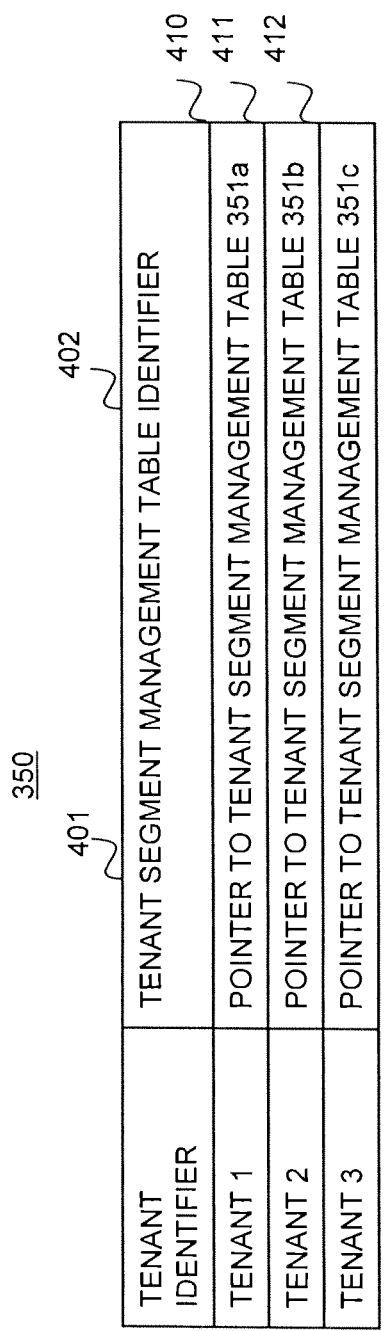
FIG. 4 illustrates a configuration example of a tenant management table 350.

FIG. 4 illustrates a configuration example of the tenant management table 350.

The tenant management table 350 is generated by the tenant configuration generating unit 320 at the time of generating the configuration of the tenant, and deleted at the time of deleting the tenant configuration. Further, at the time of changing the configuration of the tenant, the tenant management table 350 is referred to from the device specifying unit 340 in the network configuration changing unit 332. The tenant management table 350 manages correspondence between the tenants and pointers to the tenant segment management tables 351 that manage the tenant configurations. For example, the tenant management table 350 stores a tenant segment management table identifier 402 in correspondence with a tenant identifier 401. The tenant segment management table identifiers may be represented by, for example, pointers to tenant segment management tables 351a to 351c.

FIG. 5 illustrates a configuration example of the tenant segment management tables 351.

The tenant segment management tables 351 are each generated at the time of initially constructing the tenant, referred to at the time of changing the configuration of the tenant, and deleted at the time of deleting the tenant configuration. Also, when the number of segments within the tenant is changed by the configuration change of the tenant, table contents are updated by the management table changing unit 343.

The management server 116 includes the tenant segment management table 351 for each of the tenants. The tenant segment management table 351 manages the combination of the use case of the virtual machine with the segment information, and manages the pointers to the device management tables 352 to be referred to in each combination. For example, the tenant segment management tables 351 store use case information of the virtual machine 502, the number of VM within the segment 503, and a device management table identifier 504 in correspondence with a segment identifier 501.

The segment identifier 501 represents the segment group managed by the tenant.

The use case information of the virtual machine 502 represents, for example, whether the virtual machine 203 within the segment is present within an internal network, or in the demilitarized zone (DMZ). Aside from this information, the use case information of the virtual machine 502 may be, for example, information related to an arrangement position of the virtual machine.

The number of virtual machine represents the number of servers belonging to an appropriate segment. When the number of servers in the appropriate segment is changed with a change in the configuration, the number of virtual machines is updated.

The device management table identifier 504 may be represented by, for example, the pointers of device management tables 352a to 352d.

FIG. 6 illustrates a configuration example of the device management tables 352.

The management server 116 includes the device management table 352 for each of the tenants and each of the segments.

The device management tables 352 manage correspondence of NW setting items with target NW devices. For example, each of the device management tables 352 stores setting items 602 in correspondence with identification information 601 of the target devices therein. The setting items 602 are, for example, network setting such as filtering 602a, routing 602b, and VLAN setting 602c. The device management tables 352 each have, for example, respective fields of the filtering 602a, the routing 602b, and the VLAN setting 602c, and, for example, a flag is set for the item of the target device (mark O in FIG. 6). A storage form of the setting items may be an appropriate form.

FIG. 6(a) illustrates an example of the device management tables 352 for a certain segment. In the segment, filtering is set for the firewall 141a. FIG. 6(b) illustrates an example of the device management tables 352 for the other segments. In this segment, filtering is set for the firewall 141a, routing is set for the firewall 141c and the switch 161b, and VLAN is set for the switches 161a and 161c. A plurality of items may be set for one target device.

When the target devices are made redundant, and the matching of setting is automatically ensured between the redundant devices, the network setting of the setting item corresponding to one device (for example, active device) may be conducted.

FIG. 7 illustrates a configuration example of the setting items specifying table 353. The setting items specifying table 353 is generated by the management server in advance, and referred to by the device specifying unit 340.

The setting items specifying table 353 stores therein, for example, a type of configuration change request 701, a state of the target segment 702, classification information 703, presence or absence information of the virtual machine in the target segment after changing the configuration 704, information presenting a change in the number of segments after changing the configuration 705, identification information of the setting item 706, and a setting type 707 in correspondence with each other in advance.

The type of configuration change request 701 represents any one of addition, deletion, and movement of the virtual machine.

The target segment 702 represents whether the segment which is a target of the type of configuration change request 701 is an existing segment, or a new segment. Also, the classification information 703 represents the classification of the target segment 702. For example, when the type of configuration change request 701 is "addition", the target segment represents a segment to be added, and classifies whether the segment is existing or new. When the type of configuration change request 702 is "deletion", the target segment is to be deleted, and represents that the segment is existing. When the type of configuration change request 701 is "movement", it is classified whether each of a source segment and a target segment is existing or new.

The presence or absence of the virtual machine in the target segment after changing the configuration 704 specifies the presence or absence of the virtual machine existing in the target segment after changing the configuration. In the case of deletion and movement except for addition, it is specified whether the virtual machine after changing the configuration is present or absent for each of the source and the target.

The change in the number of segments 705 specifies whether the change in the number of segments after changing the configuration is "no change", "increase in the number of segments", or "decrease in the number of segments", on the basis of the presence or absence of the virtual machine 704.

The setting item 706 represents the setting items to be set. The setting items include, for example, filtering, routing, and VLAN setting, but are not limited to those items. For example, when the configuration change request is addition, if the segment to be added is the existing segment, because the number of segments after changing the configuration is not changed, the setting item is only "filtering". Alternatively, when the configuration change request is deletion, the deletion target is the existing segment, and if the virtual machine is not present after changing the configuration, the number of segments after changing the configuration is reduced. As a result, "filtering", "routing", and "VLAN setting" are required.

The setting type 707 specifies, when generating the setting, whether the setting is a type of generating commands, or a type of deleting commands. The identifier is referred to by the command generating unit 341. The "generation type" means, for example, that a command group for setting information for the device by using one or more set commands is generated. The "deletion type" means, for example, that a command group for deleting the information on the device by using one or more unset commands is generated.

FIG. 15 illustrates a configuration example of the VLAN management table 354. The VLAN management table 354 manages correspondence of the tenants and the segments using the VLAN. The VLAN management table 354 is updated when initially constructing the tenant, when changing the tenant configuration, and when deleting the tenant configuration.

The VLAN management table 354 stores, for example, a VLAN identifier 1501, a tenant identifier 1502, and a segment identifier 1503 in correspondence with each other therein.

FIG. 16 illustrates a configuration example of the route management tables 355. The route management tables 355 each manage route information among the segments. The route management tables 355 are updated when the segment configuration is changed at the time of changing the configuration of the tenant.

The route management tables 355 store, for example, identification information of the source segment 1601, a target address/net mask 1602, and identification information of a gateway 1603 in correspondence with each other therein.

Figure 8:
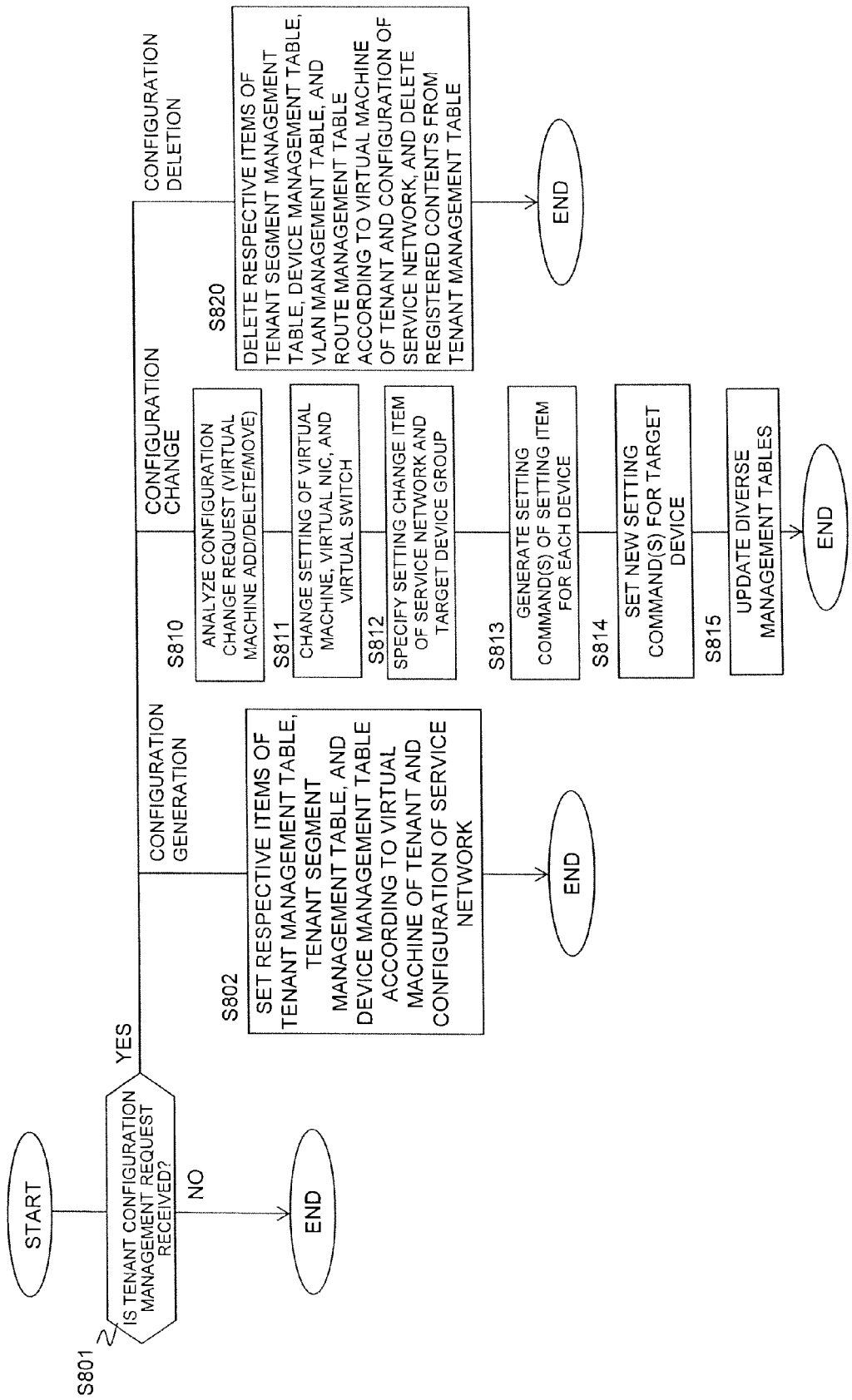
FIG. 8 is a diagram illustrating a tenant system configuration management flow.

FIG. 8 is a diagram illustrating a tenant system configuration management flow.

The configuration management request receiving unit 301 receives a tenant configuration management request from the management consoles 135a and 135b (S801). The tenant configuration management request includes, for example, a request for a new configuration of the tenant, a request for configuration change, and a request for configuration deletion. Information for discriminating those requests may be included in the tenant configuration management request. The configuration management request receiving unit 301 determines whether the tenant configuration management request is for the new configuration, the configuration change, or the configuration deletion. If the request is for the new configuration, the configuration management request receiving unit 301 outputs the tenant configuration management request to the tenant configuration generating unit 302. On the other hand, if the request is for the configuration change, the configuration management request receiving unit 301 outputs the tenant configuration management request to the request analyzing unit 330. If the request is for the configuration deletion, the configuration management request receiving unit 301 outputs the tenant configuration management request to the tenant configuration deleting unit 305.

In this case, if the tenant configuration management request represents the request for the configuration change (hereinafter referred to as "configuration change request"), the configuration change request includes, for example, the type information presenting any one of addition/deletion/movement of the virtual machine, the tenant identifier, and the segment identifier. If the type information represents the addition and movement of the virtual machine, the configuration change request further includes use case information representing whether the configuration change request is outside (DMZ) or inside. Also, if the type information represents the movement of the virtual machine, the segment identifier includes the segment identifier of the source, and the segment identifier of the target.

If the received tenant configuration management request represents the request for the new configuration, the tenant configuration generating unit 302 sets the respective items of the tenant management table 350, the tenant segment management tables 351, and the device management tables 352 according to the virtual machine of the tenant and the configuration of the service network (S802). The setting of each table may be conducted by an appropriate technique. For example, a setting file may be generated in correspondence with the virtual machine of the tenant and the configuration of the service network in advance, and the tenant configuration generating unit 302 may set the respective tables according to the setting file. Also, the tenant configuration generating unit 302 may sequentially set the respective tables with the use of a user interface.

If the received tenant configuration management request represents the request for the configuration deletion, the tenant configuration deleting unit 305 deletes the setting of the tenant segment management tables 351 and the device management tables 352 according to the virtual machine of the tenant and the configuration of the service network. The setting deletion of the respective tables is conducted in the same manner as that of processing at the time of making the configuration change request which will be described later, and therefore will not be described now. After the setting of the respective tables has been deleted, the information of the tenants to be deleted is deleted from the tenant management table 350.

On the other hand, if the received tenant configuration management request represents the configuration change request, the request analyzing unit 330 first analyzes the configuration change request (S810). For example, the request analyzing unit 330 discriminates whether the configuration change request represents the addition, deletion, or movement of the virtual machine. Subsequently, the virtual machine configuration changing unit 331 changes the setting of the virtual machine, the virtual NIC, and the virtual switch (S811). The change of this setting may be conducted in the same manner as the conventional one.

The device specifying unit 340 specifies the setting change items and the target device group in the service network (S812). Then, the command generating unit 341 generates one or more setting commands for the setting item for each of the devices (S813). Steps S812 and S813 will be described in detail later.

The device setting unit 342 sets new setting for the target device (S814). For example, the device setting unit 342 transmits the generated setting command(s) to the corresponding devices, respectively, to change the setting in the respective devices. Also, the management table changing unit 343 updates the diverse management tables as occasion demands (S815). For example, with the configuration change of the tenant, the management table changing unit 343 adds a new segment to the tenant segment management table 351, and updates the VLAN management table 354 if the number of segments is increased. The management table changing unit 343 updates the route management tables 355 if a communication between the new segment and the existing segment is necessary.

Figure 9:
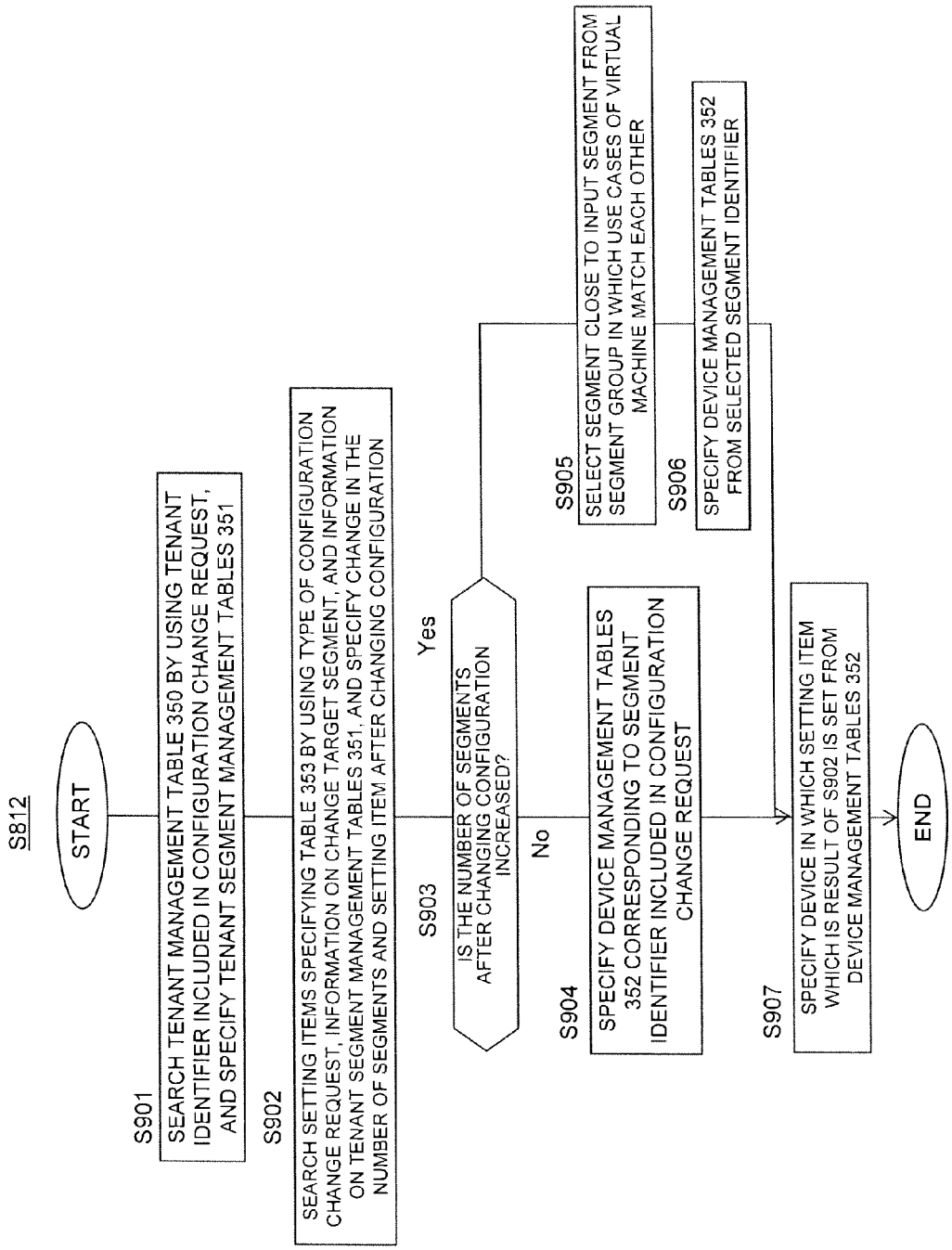
FIG. 9 is a diagram illustrating an NW setting device specifying processing flow.

FIG. 9 is a diagram illustrating an NW setting device specifying processing flow. FIG. 9 is a detailed flowchart of the above-mentioned Step S812.

The device specifying unit 340 in the network configuration changing unit 332 searches the tenant management table 350 with the use of the tenant identifier included in the configuration change request, and specifies the corresponding tenant segment management tables 351 (S901). For example, the device specifying unit 340 acquires a tenant segment management table identifier (pointer in the example of FIG. 4) corresponding to the tenant identifier in the tenant management table 350.

The device specifying unit 340 searches the setting items specifying table 353 with the use of the type of the configuration change request, information (for example, existing or new) on the change target segment, and the information on the tenant segment management tables 351, and specifies a change in the number of segments and the setting item after changing the configuration (S902). For example, the device specifying unit 340 acquires, for example, information representing any one of no change/increase/decrease as the change in the number of segments after changing the configuration, and acquires, for example, the combination of filtering, routing, and the VLAN setting as the setting item.

Figure 10:
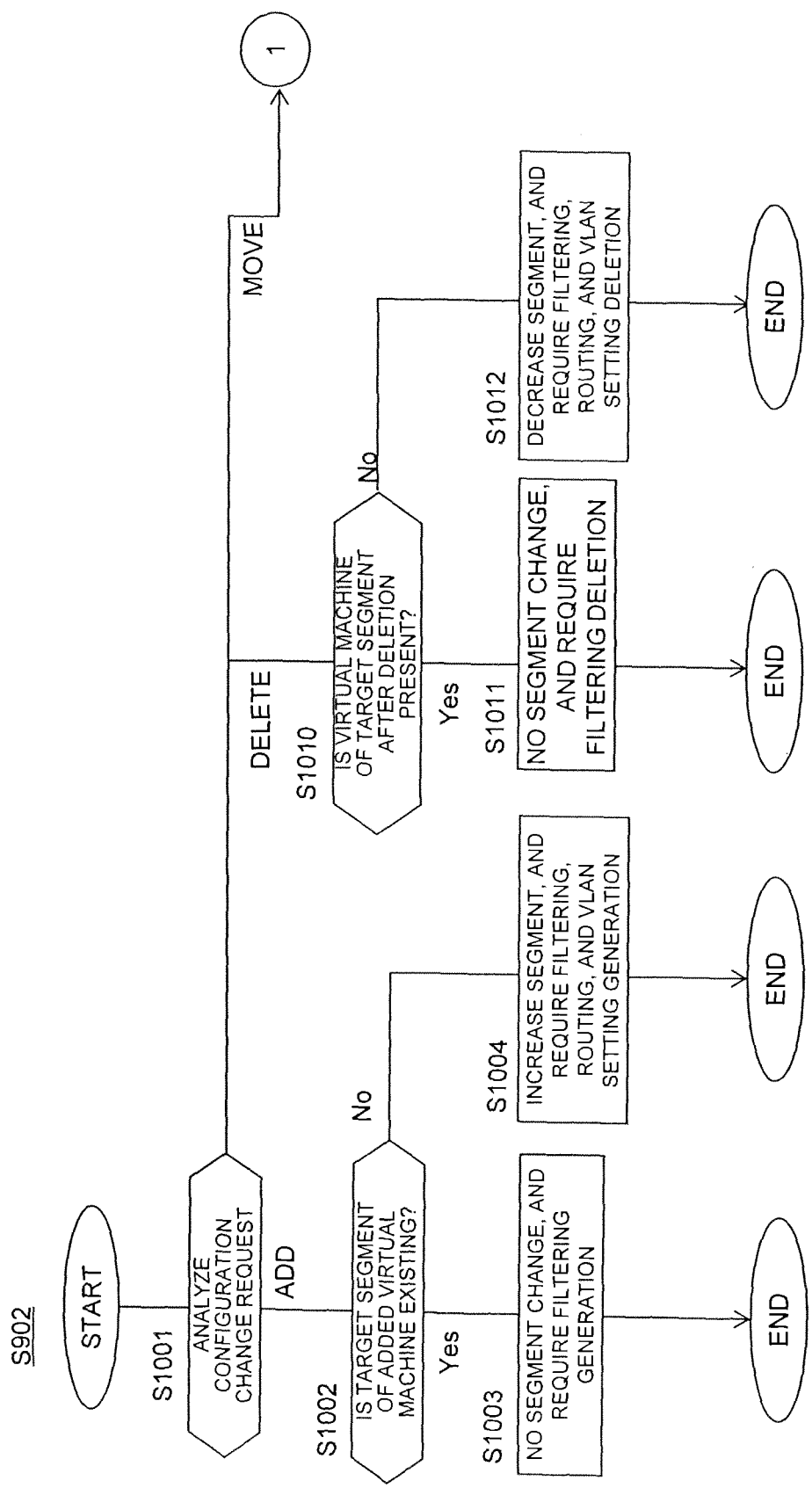
FIG. 10 is a diagram illustrating a setting item specifying processing flow.
Figure 11:
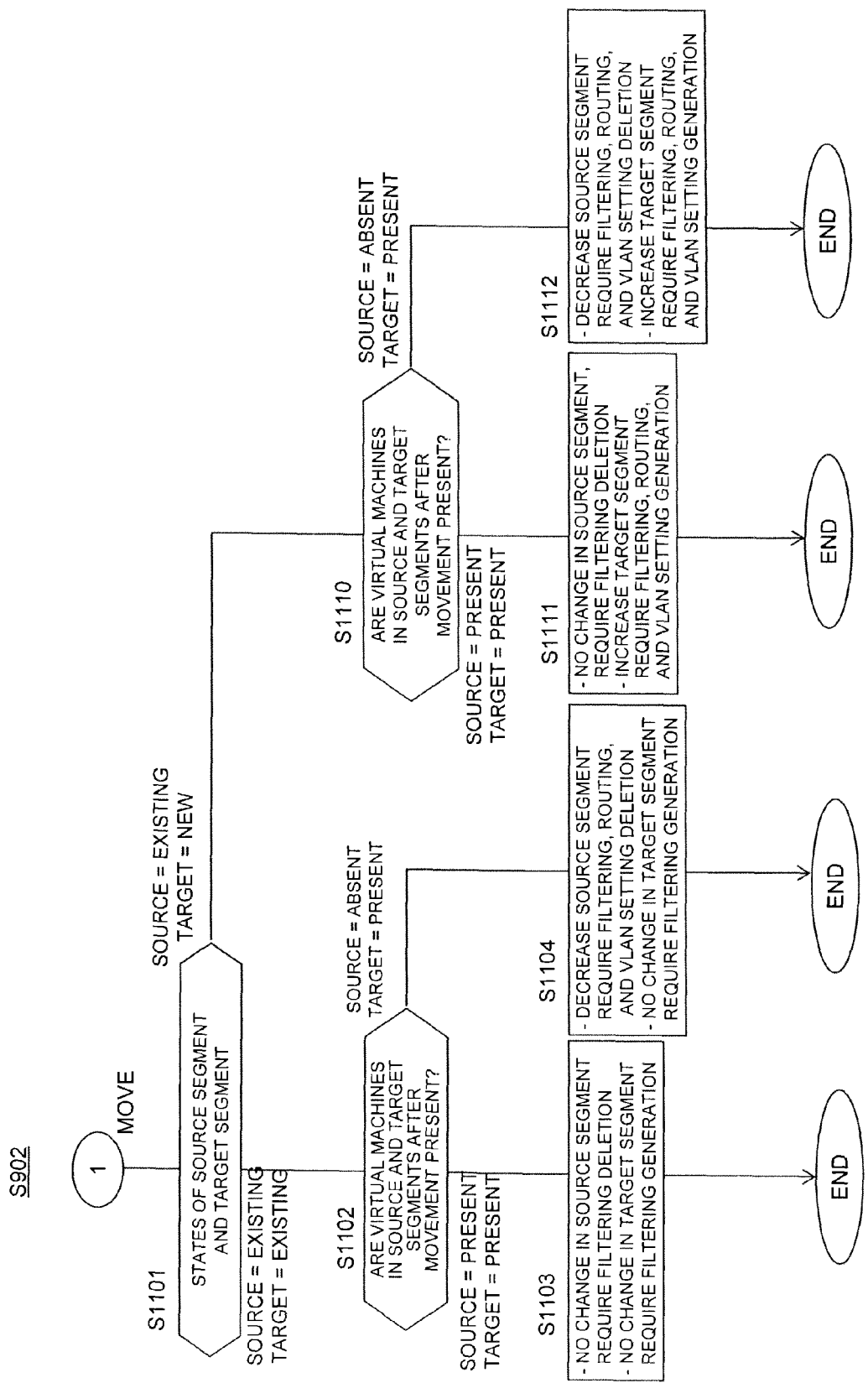
FIG. 11 is a diagram illustrating a setting item specifying processing flow (travel case).

Now, processing of Step S902 will be described in detail. FIG. 10 is a diagram illustrating a setting item specifying processing flow (addition, deletion case), and FIG. 11 is a diagram illustrating a setting item specifying processing flow (movement case).

First, according to analysis results of the configuration change request, the device specifying unit 340 proceeds to processing of Step S1002 if the type of the configuration change request represents the addition of the virtual machine. The device specifying unit 340 proceeds to processing of Step S1010 if the type of the configuration change request represents the deletion of the virtual machine. The device specifying unit 340 proceeds to processing of Step S1101 if the type of the configuration change request represents the movement of the virtual machine (S1001).

The addition of the virtual machine will be described. In Step S1002, the device specifying unit 340 determines whether the target segment of the added virtual machine is existing, or not (S1002). For example, the device specifying unit 340 refers to the tenant segment management table 351a of the target tenant according to the pointer to the tenant segment management table acquired in Step S901. The device specifying unit 340 determines that the information on the addition target segment is "existing" if the segment identifier included in the configuration change request matches the segment recorded in the tenant segment management table 351a (yes in S1002). On the other hand, the device specifying unit 340 determines that the information on the addition target segment is "new" if the segment identifier included in the configuration change request is not stored in the tenant segment management table 351a (if there exists no matched segment) (no in S1002). Those determined information may be appropriately stored.

The device specifying unit 340 acquires the change in the number of corresponding segments after changing the configuration 705, the information on the setting item 706, and the setting type 707 with reference to the setting items specifying table 353 on the basis of the type of the configuration change request, and the information on the target segment (S1003, S1004). The device specifying unit 340 specifies the presence or absence of the virtual machine in the target segment after changing the configuration 704, and the change in the number of corresponding segments after changing the configuration 705, on the basis of the number of virtual machines registered in the tenant segment management tables 351, and the type 701, the target segment 702, and the classification 703 in the setting items specifying table 353.

For example, if the type of the configuration change request represents "addition", and the target segment of the virtual machine to be added is existing (yes in S1002), the device specifying unit 340 acquires information that there is no change in the number of segments, filtering is necessary as the setting item, and generating is necessary as the setting type (S1003). On the other hand, if the type of the configuration change request represents "addition", and the target segment of the virtual machine to be added is not existing (in a case of new) (no in S1002), the device specifying unit 340 acquires information that there is an increase in the number of segments, filtering, routing and the VLAN setting are necessary as the setting item, and generating is necessary as the setting type (S1004).

The deletion of the virtual machine will be described. In Step S1010, the device specifying unit 340 determines whether the virtual machine is present in the target segment after deletion, or not (S1010). For example, the device specifying unit 340 refers to the tenant segment management table 351a of the target tenant according to the pointer to the tenant segment management tables 351 acquired in Step S901 as in the above-mentioned Step S1002. The device specifying unit 340 acquires the number of corresponding virtual machines within the segment 503 with reference to the segment identifier 501 in the tenant segment management table 351a, on the basis of the segment identifier included in the configuration change request. Since there is no virtual machine in the segment after deletion if the number of virtual machines is 1, the device specifying unit 340 determines that there is no virtual machine in the target segment after deletion (no in S1010). On the other hand, since the virtual machine is present in the segment after deletion if the number of virtual machines is 2 or more, the device specifying unit 340 determines that the virtual machine is present in the target segment after deletion (yes in S1010).

The device specifying unit 340 acquires the change in the number of corresponding segments after changing the configuration 705, the information on the setting item 706, and the setting type 707 with reference to the setting items specifying table 353, on the basis of the information on the type of the configuration change request, and the presence or absence of the virtual machine in the target segment after deletion (S1011, S1012).

For example, if the device specifying unit 340 determines that the virtual machine is present in the target segment after deletion (yes in S1010), the device specifying unit 340 acquires information that there is no segment change, filtering is necessary as the setting item, and deletion is necessary as the setting type (S1011). On the other hand, if the device specifying unit 340 determines that there is no virtual machine in the target segment after deletion (no in S1010), the device specifying unit 340 acquires information that there is a segment decrease, filtering, routing, and the VLAN setting are necessary as the setting item, and deletion is necessary as the setting type (S1012).

Subsequently, the movement of the virtual machine will be described. In Step S1101, the device specifying unit 340 determines the respective states of a source segment and a target segment (S1101). The device specifying unit 340 determines whether the source segment and the target segment are existing or new, in the same manner as that of the above-mentioned Step S1002, on the basis of, for example, the segment identifier of the source and the segment identifier of the target included in the configuration change request. Since the virtual machine has already existed in the source segment, and is normally existing, an existing and new specifying processing of the source may be omitted.

If both of the source and the target are existing (S1101), the device specifying unit 340 determines the presence or absence of the virtual machine in the source and target segments after moving the virtual machine (S1102). For example, the device specifying unit 340 determines the presence or absence of the virtual machine in the source and target segments after moving the virtual machine, in the same manner as that in the above-described Step S1010, on the basis of the segment identifier of the source and the segment information of the target included in the configuration change request, and the tenant segment management table. In the target, the virtual machine is normally present because the virtual machine newly moves, and therefore a presence or absence determining processing of the virtual machine of the target may be omitted.

The device specifying unit 340 acquires the change in the number of corresponding segments after changing the configuration 705, the information on the setting item 706, and the setting type 707, with reference to the setting items specifying table 353, on the basis of the type of the configuration change request, the information on the target segment of the source and the target, and information on the presence or absence of the virtual machine in the target segment after changing the configuration in the source and the target (S1103, S1104).

For example, if the virtual machines are present in both of the source and target segments after moving the virtual machine (S1102), an entry 710e of the setting items specifying table 353 is appropriate. The device specifying unit 340 acquires information that there is no segment change, filtering is set as the setting item, and deletion is necessary as the setting type, for the source segment. The device specifying unit 340 acquires information that there is no segment change, filtering is necessary as the setting item, and generating is necessary as the setting type, for the target segment (S1103). Also, if there is no virtual machine in the source segment, and there is the virtual machine in the target segment after moving the virtual machine (S1102), an entry 710f of the setting items specifying table 353 is appropriate. The device specifying unit 340 acquires information that there is the segment decrease, filtering, routing, and the VLAN setting are set as the setting item, and deletion is necessary as the setting type, for the source segment. The device specifying unit 340 acquires information that there is no segment change, filtering is necessary as the setting item, and generating is necessary as the setting type, for the target segment (S1104).

On the other hand, in Step 1101, if it is determined that the source is existing, and the target is new (S1101), the device specifying unit 340 determines the presence or absence of the virtual machine in the source and target segments after moving the virtual machine (S1110). The details are the same as those in the above-mentioned Step S1102.

As in the above-description, the device specifying unit 340 acquires the change in the number of corresponding segments after changing the configuration 705, the information on the setting item 706, and the setting type 707, with reference to the setting items specifying table 353, on the basis of the type of the configuration change request, the information on the target segments of the source and the target, and the information on the presence or absence of the virtual machine in the target segment after changing the configuration in the source and the target (S1111, S1112).

For example, if the virtual machines are present in both of the source and target segments after moving the virtual machine (S1110), an entry 710g of the setting items specifying table 353 is appropriate. The device specifying unit 340 acquires information that there is no segment change, filtering is set as the setting item, and deletion is necessary as the setting type, for the source segment. The device specifying unit 340 acquires information that there is the segment increase, filtering, routing, and the VLAN setting are necessary as the setting item, and generating is necessary as the setting type, for the target segment (S1111). Also, if there is no virtual machine in the source segment, and there is the virtual machine in the target segment after moving the virtual machine (S1110), an entry 710h of the setting items specifying table 353 is appropriate. The device specifying unit 340 acquires information that there is the segment decrease, filtering, routing, and the VLAN setting are set as the setting item, and deletion is necessary as the setting type, for the source segment. The device specifying unit 340 acquires information that there is the segment increase, filtering, routing, and the VLAN setting are necessary as the setting item, and generating is necessary as the setting type, for the target segment (S1112).

Returning to FIG. 9, the device specifying processing flow will be continuously described.

In Step S903, the device specifying unit 340 determines whether the number of segments after changing the configuration is increased, or not (S903). For example, the device specifying unit 340 determines whether the number of segments after changing the configuration is increased, or not, according to information representing any one of no segment change/segment increase/segment decrease, which is acquired in the above-described Step S902. If the number of segments is not increased (no in S903), the device specifying unit 340 specifies the device management tables 352 corresponding to the tenant identifier and the segment identifier included in the configuration change request (S904). The device specifying unit 340 specifies the device in which the setting item searched in the above-mentioned Step S902 is set, from the specified device management tables 352 (S907). In the example of FIG. 6, for example, if the device management table 352c is specified, and filtering is acquired as the setting item, the device specifying unit 340 acquires the identification information 601 on the corresponding target device with reference to the field 602a of filtering in the setting items 602. In the example of FIG. 6(b), the firewall 141a is acquired as the target device. The same is applied to the routing and the VLAN setting. For example, in the case of the routing, in the example of FIG. 6(b), the firewall 141c and the switch 161b are acquired as the target devices. Also, in the case of the VLAN setting, in the example of FIG. 6(b), the switch 161a and the switch 161c are acquired as the target devices. If the setting item acquired in Step S902 is only the filtering, the field of filtering in the device management table 352 may be referred to. This makes it possible to reduce the number of searches, and to reduce a processing time, and save a power.

In the case of the movement of the virtual machine, Steps S904 and S907 are executed for each of the source and the target.

In Step S903, if it is determined that the number of segments is increased (yes in Step S903), because this corresponds to, for example, a case in which a new segment is added. For that reason, there may be no corresponding device management table. Under the circumstances, the device specifying unit 340 selects a segment close to an input segment from a segment group in which the use cases of the virtual machines match each other (S905). More specifically, the device specifying unit 340 specifies an entry group in which the use cases of the virtual machine 502 in the tenant segment management tables 351 match the use cases of the virtual machine included in the configuration change request, with reference to the tenant segment management tables 351 specified in Step S901, and selects one segment identifier from the segment identifiers of the respective specified entries. For example, if the use case of the virtual machine included in the configuration change request is "outside (DMZ)", any one of the segments A and B is selected in the example of FIG. 5. The device specifying unit 340 specifies the device management tables 352 corresponding to the selected segment identifier (S906). Thereafter, the flow shifts to processing of Step S907.

Figure 12:
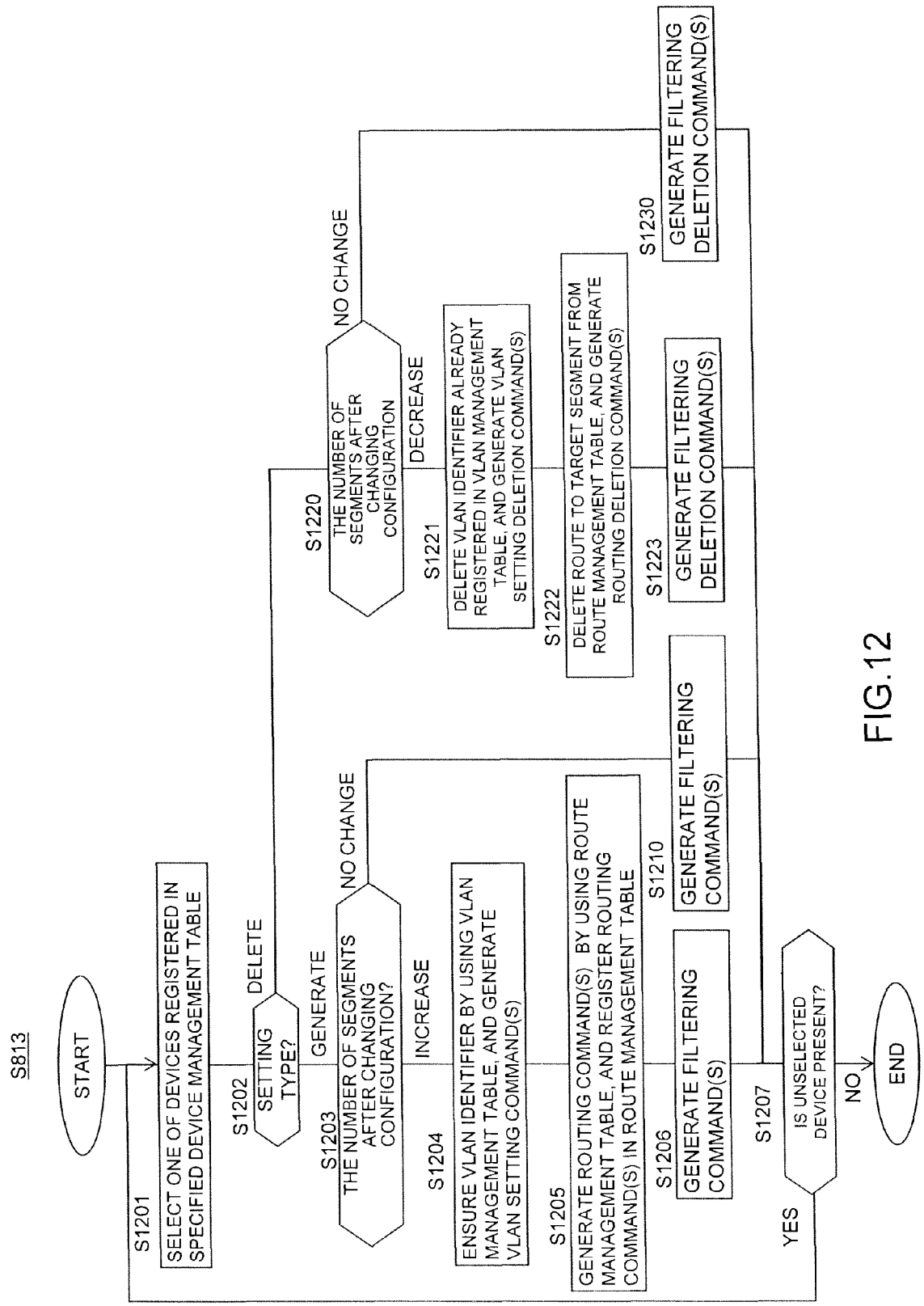
FIG. 12 is a diagram illustrating an NW command generating processing flow.

FIG. 12 is a diagram illustrating an NW command generating processing flow. FIG. 12 is a detailed flowchart of the above-mentioned Step S813. In this example, a description will be given of a case in which filtering is specified as the setting item.

The command generating unit 341 selects one of the devices registered in the specified device management table 352 (S1201). More specifically, the command generating unit 341 selects one of the devices specified in Step S907. That is, the command generating unit 341 selects one of the devices in which the specified setting items are set, in the device management tables 352 of the appropriate segment.

The command generating unit 341 determines the setting type (S1202). The setting type is information representing "generation" or "deletion" acquired in the flows of FIGS. 10 and 11. The command generating unit 341 shifts to Step S1203 if the setting type is the generation, and shifts to Step S1220 if the setting type is the deletion.

In Step S1203, the command generating unit 341 determines whether the number of segments after changing the configuration is increased, or not (S1203). For example, the command generating unit 341 may make the determination on the basis of the information of "no segment change", "segment increase", and "segment decrease" which are determined in the flow of FIGS. 10 and 11.

If there is no change in the number of segments, the command generating unit 341 generates one or more filtering commands (S1210). The generating technique of the command (s) in each setting may be conducted by an appropriate technique. Thereafter, the flow shifts to Step S1207.

On the other hand, if the number of segments is increased, the command generating unit 341 ensures an unused VLAN identifier 1501 with the use of the VLAN management table 354, and generates one or more VLAN setting commands (S1204). For example, the command generating unit 341 allocates a VLAN ID not stored in the VLAN management table 354. Also, the command generating unit 341 stores the allocated VLAN ID, and the tenant identifier and the segment identifier included in the configuration change request in correspondence with each other in the VLAN management table 354 at an appropriate timing. Also, the command generating unit 341 generates one or more routing commands with the use of the route management tables 355, and registers the routing command (s) in the route management tables 355 (S1205). As one example, if the identifier of the segment to be added is the segment E, and the use case is outside (DMZ), the command generating unit 341 copies an entry 1610 of the segment A selected in the above-mentioned Step S905, and rewrites the segment A of the source identifier 1601 into the segment E. Also, the command generating unit 341 generates the filtering command(s) (S1206).

The command generating unit 341 determines whether an unselected device is present in the devices specified in Step S907, or not (S1207). If the unselected device is present, the flow returns to Step S1201, and repeats the subsequent processing for other devices. In this situation, if the VLAN identifier has already been ensured in Steps S1204 and S1205, and the information has been registered in the route management table, those processing may be omitted.

The deletion of the setting type will be described. In Step S1220, the command generating unit 341 determines whether the number of segments after changing the configuration is decreased, or not (S1220). For example, as in the above-mentioned Step S1203, the command generating unit 341 may make the determination on the basis of the information of "no segment change", "segment increase", and "segment decrease" which are determined in the flows of FIGS. 10 and 11.

If there is no change in the number of segments, the command generating unit 341 generates one or more filtering deletion commands (S1230). Thereafter, the flow shifts to Step S1207.

On the other hand, if the number of segments is decreased, the command generating unit 341 deletes the VLAN identifier 1501 registered in the VLAN management table 354, and generates one or more VLAN deletion commands (S1221). For example, the command generating unit 341 searches an entry of the VLAN management table 354 in which the tenant identifier included in the configuration change request matches the segment identifier, and deletes the appropriate entry. Also, the command generating unit 341 deletes a route to the target segment from the route management tables 355, and generates one or more route deletion commands (S1222). The command generating unit 341 generates the filtering deletion command(s) (S1223). Thereafter, the flow shifts to Step S1207.

Figure 13:
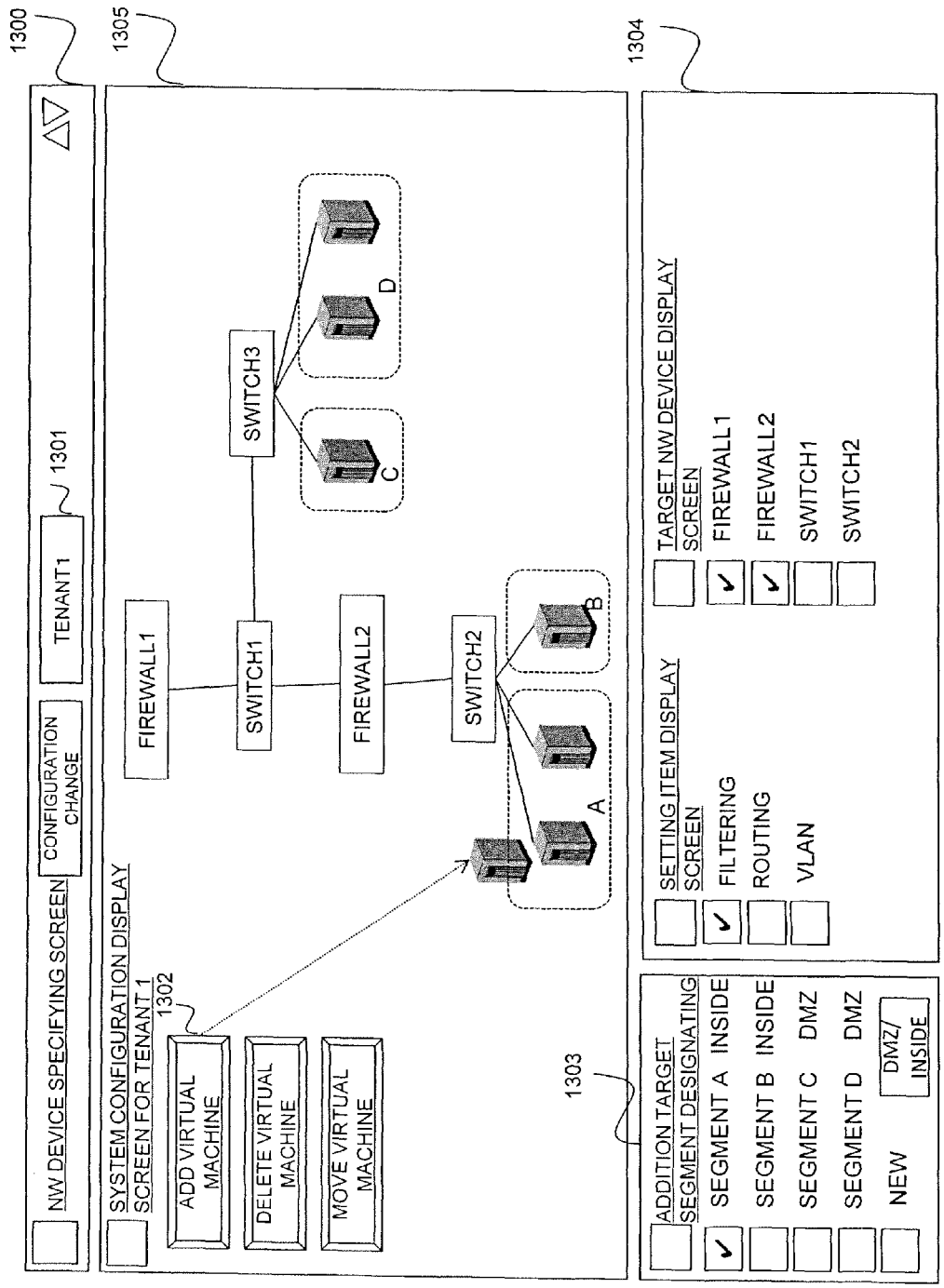
FIG. 13 illustrates an NW configuration device specifying screen image.

FIG. 13 illustrates an image example of an NW configuration device specifying screen.

The NW configuration device specifying screen is displayed in the management consoles 135a and 135b. The screen illustrated in FIG. 13 is exemplary, and other screens may be applied. The NW configuration device specifying screen includes, for example, an NW device specifying screen 1300, a system configuration display screen 1305, a target segment designating screen 1303, and a setting item display screen and target NW device display screen 1304.

In the NW device specifying screen 1300, identification information 1301 on the tenant to be changed in configuration is displayed. The tenant may be selected by a pull-down menu.

In the system configuration display screen 1305, a schematic diagram of the system configuration of the tenant is displayed. Also, the system configuration display screen 1305 has a select button 1302 of the virtual machine addition/virtual machine deletion/virtual machine movement. In the case of the virtual machine addition, for example, as shown in the figure, the segment to which the virtual machine is added may be dragged and dropped. The same is applied to the deletion and the movement.

In the target segment designating screen 1303, in the case of the virtual machine addition, the addition target segment is designated. The same is applied to the case of the virtual machine deletion. In the case of the virtual machine movement, both of the source and the target are designated. If the drag and drop are enabled as described above, the target segment may be automatically ticked.

In the setting item display screen, any setting item of the filtering/routing/VLAN is ticked. In the target NW device display screen, the target device is ticked in the devices configuring the tenant. The setting item display screen and target NW device display screen 1304 may be ticked so that the management consoles 135a and 135b tick the setting item and the device specified along the above-mentioned flowchart.

Figure 14:
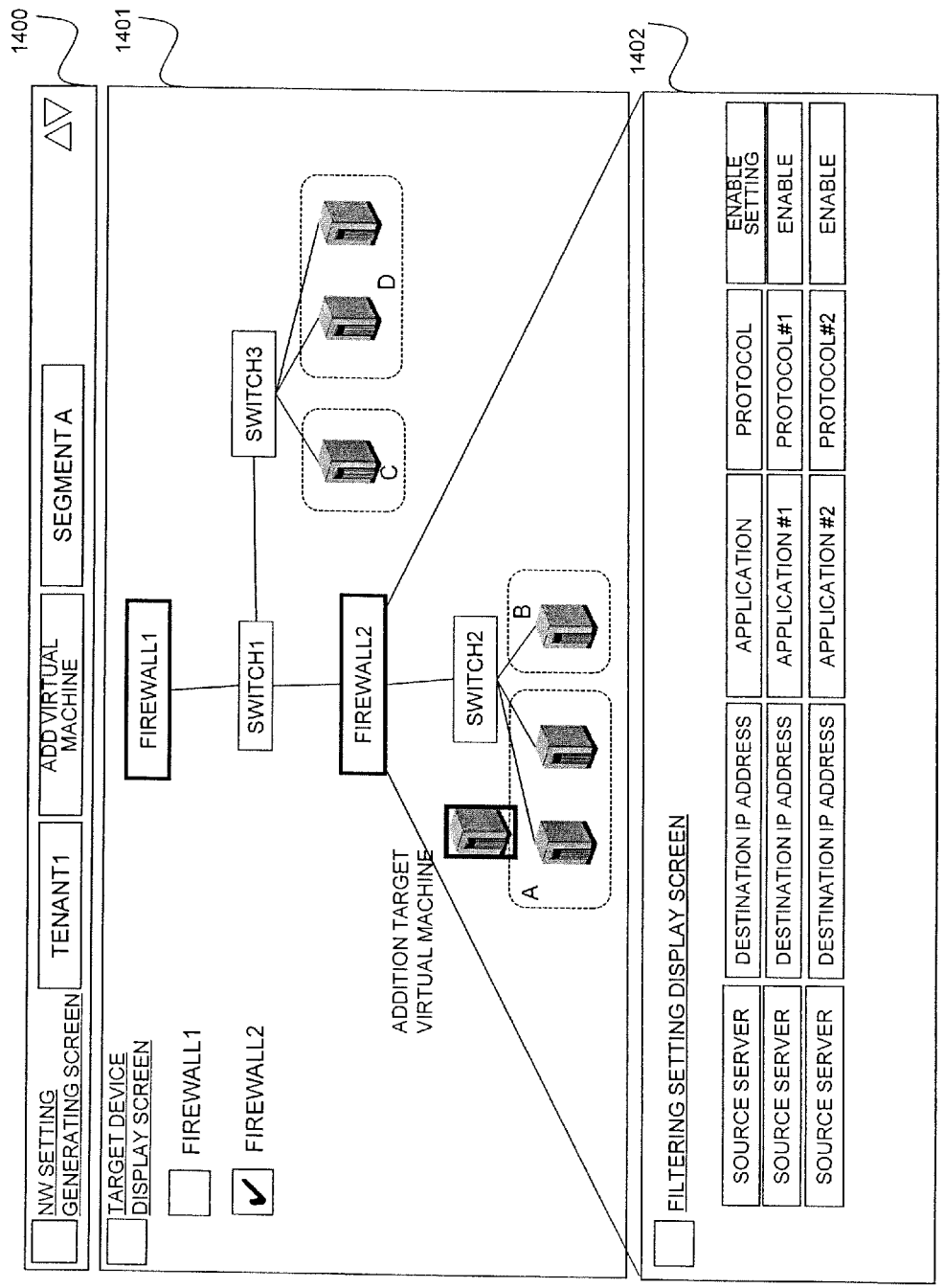
FIG. 14 illustrates an NW command generating screen image.

FIG. 14 illustrates an image example of the NW command generating screen.

The NW command generating screen is displayed in the management consoles 135a and 135b. The screen illustrated in FIG. 14 exemplifies a screen for setting the filtering, but other screens may be applied. The NW command generating screen includes, for example, an area 1400 in which the identification information on the tenant, information representing the addition/deletion/movement of the virtual machine, and the identification information on the segment are displayed, a target device display screen 1401, and a filtering setting display screen 1402.

In the target device display screen 1401, the target devices (firewall 1, firewall 2 in the figure), and check boxes are displayed. The target devices correspond to, for example, the devices in the target NW device display screen in FIG. 13. When one of the check boxes is selected, the corresponding filtering setting display screen 1402 is displayed. An operator of the management console 135 inputs filtering information according to the display. The input information is reflected on the setting command(s) in FIG. 12. Also, the routing and the VLAN setting may be set in the same manner.

According to this embodiment, for example, the setting change item and the target device may be rapidly and easily specified at the time of changing the configuration of the virtual machine in the specified tenant. Also, the setting change item and the target device which are different for each of the tenants may be specified on the basis of the use case of the virtual machine and the network configuration requirement, at the time of changing the configuration of server configuration. According to this embodiment, the NW device to be set may be specified for each of the setting change items. Also, according to this embodiment, the setting change item may be specified by utilizing the use case of the virtual machine and the segment information.

(Configuration Examples)

The management server according to the present invention is, for example, a management device in a multi-tenancy information processing system including a plurality of clients, a service network having plural types of network devices, and a plurality of servers, in which a virtual machine is configured in the servers, the management device:

is coupled with the respective devices configuring the multi-tenancy information processing system through a management network, is managed through a management console, and includes a tenant management table that manages correspondence between a tenant identifier and tenant configuration information, a tenant segment management table that manages correspondence of the tenant configuration information including a use case of the virtual machine configuring a tenant and a segment identifier with a device management table, a network setting management table that manages correspondence of a network setting target device present in a segment within the tenant with a setting item, and a setting items specifying table that manages correspondence of a type of a virtual machine configuration change request with a network setting item, the management device may include:

a configuration management request receiving unit that receives the virtual machine configuration change request of the tenant from the management console, a request analyzing unit that analyzes whether the received request is an addition request for the virtual machine, a deletion request for the virtual machine, or a movement request for the virtual machine, a virtual machine configuration changing unit that changes the setting in the plurality of servers, and a network configuration changing unit that changes the setting in the network devices configuring the service network, on the basis of the request analysis results, and the network configuration changing unit may include:

a device specifying unit that specifies a target device required to set the setting item on the basis of a request type analyzed by the request analysis, the tenant identifier to which the virtual machine belongs, the segment identifier of the virtual machine, and the use case of the virtual machine, a command generating unit that generates a command for each of the devices specified by the device specifying unit, a configuration setting unit that sets the command generated by the command generating unit for each of the devices, and a management table changing unit that reflects setting change contents on the management table.

The above-mentioned management server may further include:

a virtual machine additional condition specifying unit that receives the result of a multi-tenant configuration change request analyzing unit received from the management console, and specifies whether the segment to which the virtual machine to be added belongs, is new or existing, if the configuration change request is the addition request for the virtual machine, a virtual machine deletion condition specifying unit that specifies presence or absence of the virtual machine in the segment to which the virtual machine to be deleted belongs if the configuration change request is the deletion request for the virtual machine, a virtual machine movement condition specifying unit that specifies information on a source segment and a target segment, and presence or absence of the virtual machine in the respective segments after movement, if the configuration change request is the movement request for the virtual machine, and a setting item specifying unit that specifies the setting item on the basis of the virtual machine configuration change condition.

The above-mentioned management server may further include:

a virtual network management table that manages correspondence between an identifier of a virtual network and the tenant identifier in the multi-tenancy information processing system, and a route management table that manages route information among a plurality of segments configuring the multi-tenancy information processing system, the network setting items specifying table further includes information representing a setting type representing whether the setting is to be added or deleted, and an increase or decrease in the number of segments after changing the configuration, and the management server may include:

a device selecting unit that selects the device from the network setting management table, a setting specifying unit that specifies the setting item on the basis of the setting type and increase/decrease information on the number of segments after changing the configuration for the selected device, and a command generating unit that generates setting command(s) to be set for the selected device.

Also, the above-mentioned management server includes a configuration management interface, and the configuration management interface may include the type of the configuration change request, the identifier of the tenant, information on a configuration change target segment, and the use case of the virtual machine in the configuration change request of the virtual machine.

(Others)

The configuration management method according to the present invention may be provided by a configuration management program for causing a computer to execute the respective steps, a computer readable recording medium that records the configuration management program, a program product that includes the configuration management program and may be loaded into an internal memory of the computer, and a computer such as a server including the program.

INDUSTRIAL APPLICABILITY

The present invention may be used in, for example, the multi-tenancy information processing system.

The invention claimed is:

1. A management server in a multi-tenancy information processing system having plural types of network devices, a server device, and the management server, configuring a tenant which is a virtual network system including a desired network device of the network devices and a virtual machine configured by the server device for each client, in which the tenant has a plurality of segments, each including a corresponding server group arranged therein, the management server comprising:

a device management table for storing, for each tenant and each segment, network setting items set for a network device in correspondence with an identifier of the network device corresponding to the segment of the tenant in advance; and a tenant configuration changing unit configured to specify the network setting items to be set and the network devices being a setting target at the time of changing the configuration of the virtual machine, wherein the tenant configuration changing unit is configured to:

receive, from a computer as a management console through a computer network, a configuration change request including type information on a request representing any one of addition, deletion, and movement of the virtual machine, a tenant identifier of a target tenant, and a segment identifier of a target segment, determine whether or not the virtual machine is present in the target segment of the target tenant after changing the configuration, and/or whether or not the target segment of the target tenant is existing, specify one or a plurality of the network setting items on the basis of the type information on the request included in the configuration change request, and both or either determination results of whether or not the virtual machine is present in the target segment after changing the configuration, and determination results of whether or not the target segment is existing, and specify one or plurality of the network devices corresponding to one or the plurality of specified network setting items, with reference to the device management table, wherein the type information on the configuration change request represents the movement of the virtual machine, and the segment identifier included in the configuration change request includes a segment identifier of a source segment, and a segment identifier of the target segment,
wherein the tenant configuration changing unit is configured to:
when the type information on the configuration change request represents the movement of the virtual machine, determine, for each of the source segment and each of the target segment, whether or not the segments are existing, and determine whether or not the virtual machine is existing after moving the virtual machine, and
specify the network setting item of the source segment and the network setting item of the target segment according to determination results, respectively.

2. The management server according to claim 1,
wherein the tenant configuration changing unit is configured to generate setting information for setting specified network setting item for specified network device.

3. The management server according to claim 1,
wherein the network setting item includes at least two of filtering, routing, and virtual network setting.

4. The management server according to claim 1,
wherein the tenant configuration changing unit is configured to:
when the type information on the configuration change request represents the addition of the virtual machine, determine whether or not the target segment of the target tenant to which the virtual machine is added is existing,
when the target segment is existing, select the filtering as the network setting item, and
when the target segment is not existing, select the filtering, the routing, and the virtual network setting as the network setting items.

5. The management server according to claim 1,
wherein the tenant configuration changing unit is configured to:
when the type information on the configuration change request represents the deletion of the virtual machine, determine whether or not another virtual machine is present in the target segment of the target tenant after deleting the virtual machine,
when another virtual machine is present, select the filtering as the network setting item, and
when another virtual machine is not present, select the filtering, the routing, and the virtual network setting as the network setting items.

6. The management server according to claim 1, further comprising a segment management table for storing the number of virtual machines within the segment in correspondence with the segment identifier for identifying the segment within the tenant, for each of the tenants,
wherein the tenant configuration changing unit is configured to:
determine whether or not the virtual machine is present in the target segment of the target tenant after changing the configuration, on the basis of the number of corresponding virtual machines, with reference to the segment management table on the basis of the tenant identifier and the segment identifier included in the configuration change request.

7. The management server according to claim 1, further comprising a segment management table for storing the segment identifier for identifying the segment within the tenant therein, for each of the tenants,
wherein the tenant configuration changing unit is configured to:
determine, with reference to the segment management table on the basis of the tenant identifier and the segment identifier included in the configuration change request, that the target segment of the target tenant is existing when the segment identifier is stored corresponding to the tenant, and
determine that the target segment of the target tenant is not existing when the segment identifier is not stored.

8. The management server according to claim 1, further comprising a segment management table for storing use case information of the virtual machine in correspondence with the segment identifier for identifying the segment within the tenant, for each of the tenants,
wherein the configuration change request further includes use case information of the virtual machine, and
wherein the tenant configuration changing unit is configured to:
select, with reference to the segment management table on the basis of the tenant identifier and the use case information of the virtual machine included in the configuration change request, one of the segment identifiers having identical use case information on the virtual machine in the tenant when the number of segments is to be increased after changing the configuration, and
specify a corresponding network device with reference to the device management table corresponding to the selected segment identifier.

9. The management server according to claim 1, further comprising a setting items specifying table for storing the network setting item in correspondence with the type information on the configuration change request, state information representing whether or not the target segment is existing, and presence or absence information on the virtual machine in the target segment after changing the configuration, in advance,
wherein the tenant configuration changing unit is configured to specify a corresponding network setting item with reference to the setting items specifying table on the basis of the type information on the request included in the configuration change request, determination results of whether or not the target segment is existing, and/or determination results of whether or not the virtual machine is existing in the target segment after changing the configuration.

10. The management server according to claim 9, further comprising:
a virtual network management table that manages correspondence of an identifier of the virtual network, the tenant identifier, and the segment identifier in the multi-tenancy information processing system; and
a route management table that manages route information among the plurality of segments configuring the multi-tenancy information processing system,
wherein the setting items specifying table further includes a setting type representing whether the setting is to be added or deleted, and change information representing a change in the number of segments after changing the configuration, and
wherein the tenant configuration changing unit is further configured to:
specify, from the setting items specifying table, the setting type and the change information corresponding to the type information on the request included in the configuration change request, and both or either the determination results of whether or not the target segment is existing and the determination results of whether or not the virtual machine is existing in the target segment after changing the configuration, and generate one or more setting commands including virtual network setting and routing, with the use of the virtual network management table and the route management table, according to the setting type and the change information, with respect to the specified network device, after specifying the target network device.

11. The management server according to claim 1, wherein the management server is configured to receive the configuration change request including the type information on the configuration change request input from a configuration management interface of the management console, the tenant identifier, and the segment identifier of the target segment.

12. A multi-tenancy information processing system, comprising:
plural types of network devices;
a server device; and
a management server,
the system configuring a tenant which is a virtual network system including a desired network device of the network devices and a virtual machine configured by the server device for each client, in which the tenant has a plurality of segments, each including a corresponding server group arranged therein,
wherein the management server comprises:
a device management table for storing, for each tenant and each segment, network setting items set for a network device in correspondence with an identifier of the network device corresponding to the segment of the tenant in advance; and
a tenant configuration changing unit configured to specify the network setting items to be set and the network devices being a setting target at the time of changing the configuration of the virtual machine,
wherein the tenant configuration changing unit is configured to:
receive, from a management console, a configuration change request including type information on a request representing any one of addition, deletion, and movement of the virtual machine, a tenant identifier of a target tenant, and a segment identifier of a target segment,
determine whether or not the virtual machine is present in the target segment of the target tenant after changing the configuration, and/or whether or not the target segment of the target tenant is existing,
specify one or a plurality of the network setting items on the basis of the type information on the request included in the configuration change request, and both or either determination results of whether or not the virtual machine is present in the target segment after changing the configuration, and determination results of whether or not the target segment is existing, and
specify one or plurality of the network devices corresponding to one or the plurality of specified network setting items, with reference to the device management table,
wherein the type information on the configuration change request represents the movement of the virtual machine, and the segment identifier included in the configuration change request includes a segment identifier of a source segment, and a segment identifier of the target segment,
wherein the tenant configuration changing unit is configured to:
when the type information on the configuration change request represents the movement of the virtual machine, determine, for each of the source segment and each of the target segment, whether or not the segments are existing, and determine whether or not the virtual machine is existing after moving the virtual machine, and
specify the network setting item of the source segment and the network setting item of the target segment according to determination results, respectively.

13. The multi-tenancy information processing system according to claim 12, wherein
the tenant configuration changing unit is configured to generate setting information for setting specified network setting item for specified network device, and
the network device is configured to change the setting according to generated setting information.

14. A configuration management method in a multi-tenancy information processing system having plural types of network devices, a server device, and a management server, configuring a tenant which is a virtual network system including a desired network device of the network devices and a virtual machine configured by the server device for each client, in which the tenant has a plurality of segments, each including a corresponding server group arranged therein, for specifying network setting items to be set and network devices being a setting target at the time of changing configuration of a virtual machine, the configuration management method comprising:
receiving, by the management server, from a management console, a configuration change request including type information on a request representing any one of addition, deletion, and movement of the virtual machine, a tenant identifier of a target tenant, and a segment identifier of a target segment,
determining, by the management server, whether or not the virtual machine is present in the target segment of the target tenant after changing the configuration, and/or whether or not the target segment of the target tenant is existing,
specifying, by the management server, one or a plurality of the network setting items on the basis of the type information on the request included in the configuration change request, and both or either determination results of whether or not the virtual machine is present in the target segment after changing the configuration, and determination results of whether or not the target segment is existing, and
specifying, by the management server, one or plurality of the network devices corresponding to one or the plurality of specified network setting items, with reference to a device management table for storing, for each tenant and each segment, network setting items set for a network device in correspondence with an identifier of the network device corresponding to the segment of the tenant in advance, wherein the type information on the configuration change request represents the movement of the virtual machine, and the segment identifier included in the configuration change request includes a segment identifier of a source segment, and a segment identifier of the target segment,
determining, when the type information on the configuration change request represents the movement of the virtual machine, for each of the source segment and each of the target segment, whether or not the segments are existing, and determine whether or not the virtual machine is existing after moving the virtual machine,
specifying the network setting item of the source segment and the network setting item of the target segment according to determination results, respectively.

15. The configuration management method according to claim 14, further comprising:

generating, by the management server, setting information for setting the specified network setting item for the specified network device.

* * * * *